(12) United States Patent
Brown et al.

(10) Patent No.: US 11,356,558 B2
(45) Date of Patent: *Jun. 7, 2022

(54) SYSTEMS AND METHODS FOR DYNAMICALLY CONTROLLING CONVERSATIONS AND WORKFLOWS BASED ON MULTI-MODAL CONVERSATION MONITORING

(71) Applicant: Revenue, Inc., Sherman Oaks, CA (US)

(72) Inventors: Howard A. Brown, Los Angeles, CA (US); Jeffrey K. Shelton, Los Angeles, CA (US); Jason Ouellette, San Francisco, CA (US); Kanwar Saluja, Los Angeles, CA (US)

(73) Assignee: Revenue, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,098

(22) Filed: Dec. 22, 2021

(65) Prior Publication Data

US 2022/0116500 A1 Apr. 14, 2022

Related U.S. Application Data

(63) Continuation of application No. 17/313,635, filed on May 6, 2021, now Pat. No. 11,212,389, which is a
(Continued)

(51) Int. Cl.
*H04M 3/00* (2006.01)
*H04M 3/51* (2006.01)
(Continued)

(52) U.S. Cl.
CPC ...... *H04M 3/5175* (2013.01); *G06Q 30/0281* (2013.01); *H04M 3/5183* (2013.01); *G06N 20/00* (2019.01)

(58) Field of Classification Search
CPC .............. H04M 3/5175; H04M 3/5183; G06Q 30/0281; G06N 20/00
(Continued)

(56) References Cited

U.S. PATENT DOCUMENTS

| 8,204,884 B2 | 6/2012 | Freedman et al. |
| 9,997,158 B2 | 6/2018 | Chen et al. |

(Continued)

OTHER PUBLICATIONS

Andy Paul and Sabrina Atienza, "Sales Enablement Podcast with Andy Paul—Ep. 536: Use AI on Sales Calls to Increase Rep Productivity With Sabrina Atienza", Aug. 10, 2017, online video available at www.youtube.com/watch?v=ytSrQ6exuu0 [transcript provided].

(Continued)

*Primary Examiner* — William J Deane, Jr.
(74) *Attorney, Agent, or Firm* — Ansari Katiraei LLP; Arman Katiraei; Sadiq Ansari

(57) ABSTRACT

A conversation system may dynamically control a conversation or workflow by performing multi-modal conversation monitoring, generating actions that control the conversation based on the multi-modal monitoring producing conversation elements that deviate from patterns of a selected plan for that conversation, and/or by dynamically generating and/or updating the plan for future conversations based on the pattern recognition. For instance, the conversation system may detect a pattern within completed conversations that resulted in a common outcome, may monitor an active conversation between at least an agent and a participant, may extract different sets of conversation elements from different points in the active conversation, may determine that a particular set of conversation elements deviates from the pattern, and may modify the active conversation by performing one or more actions based on the particular set of conversation elements that deviate from the pattern.

20 Claims, 11 Drawing Sheets

Related U.S. Application Data continuation-in-part of application No. 16/998,316, filed on Aug. 20, 2020, which is a continuation of application No. 16/587,680, filed on Sep. 30, 2019, now Pat. No. 10,757,256, which is a continuation of application No. 16/429,321, filed on Jun. 3, 2019, now Pat. No. 10,440,181.

(51) Int. Cl.
*G06Q 30/02* (2012.01)
*G06N 20/00* (2019.01)

(58) Field of Classification Search
USPC ....... 379/265.01–265.14, 266.01–266.1, 309
See application file for complete search history.

(56) References Cited

U.S. PATENT DOCUMENTS

| | | | |
|---|---|---|---|
| 10,015,316 B1* | 7/2018 | Horne | G06Q 50/01 |
| 10,050,918 B2 | 8/2018 | Bastide et al. | |
| 10,455,378 B2 | 10/2019 | Rakovitsky et al. | |
| 10,522,151 B2 | 12/2019 | Cartwright et al. | |
| 10,778,616 B2 | 9/2020 | Bastide et al. | |
| 10,798,027 B2 | 10/2020 | Agarwal et al. | |
| 10,878,479 B2 | 12/2020 | Wu et al. | |
| 10,887,263 B2 | 1/2021 | Bastide et al. | |
| 10,891,947 B1* | 1/2021 | Le Chevalier | H04R 1/403 |
| 2003/0074201 A1 | 4/2003 | Grashey et al. | |
| 2003/0232159 A1 | 12/2003 | Pagilagan | |
| 2013/0325992 A1 | 12/2013 | McGann et al. | |
| 2014/0220526 A1 | 8/2014 | Sylves | |
| 2017/0134577 A1 | 5/2017 | Wold | |
| 2017/0169816 A1 | 6/2017 | Blandin et al. | |
| 2017/0345416 A1* | 11/2017 | Bangalore | G10L 17/22 |
| 2018/0183929 A1 | 6/2018 | Fang et al. | |
| 2018/0309707 A1 | 10/2018 | Bastide et al. | |
| 2019/0355043 A1* | 11/2019 | Swierk | G10L 15/183 |
| 2020/0218766 A1* | 7/2020 | Yaseen | G06Q 10/04 |
| 2021/0050002 A1* | 2/2021 | Bastide | G06F 40/279 |
| 2021/0089860 A1 | 3/2021 | Heere et al. | |
| 2021/0150398 A1 | 5/2021 | Bastide et al. | |
| 2021/0157990 A1* | 5/2021 | Lima | G06F 40/216 |

OTHER PUBLICATIONS

Martin Brossman, Greg Hyer, and Sabrina Atienza, "Linking into Sales with Martin Brossman and Greg Hyer—Ep. 112: Using A.I. for Sales Conversations with Sabrina Atienza of Qurious.io—Ep. 112", Jun. 5, 2017, online video available at youtube.com/watch?v=1Lsqly9v75U [transcript provided].

\* cited by examiner

SYSTEMS AND METHODS FOR DYNAMICALLY CONTROLLING CONVERSATIONS AND WORKFLOWS BASED ON MULTI-MODAL CONVERSATION MONITORING

CLAIM OF BENEFIT TO RELATED APPLICATIONS

This application is a continuation of U.S. nonprovisional application Ser. No. 17/313,635 entitled "SYSTEMS AND METHODS FOR DYNAMICALLY CONTROLLING CONVERSATIONS AND WORKFLOWS BASED ON MULTI-MODAL CONVERSATION MONITORING", filed May 6, 2021, now U.S. Pat. No. 11,212,389, which is a continuation-in-part of U.S. nonprovisional application Ser. No. 16/998,316 entitled "ADAPTIVE REAL-TIME CONVERSATIONAL SYSTEMS AND METHODS", filed Aug. 20, 2020, which is a continuation of U.S. nonprovisional application Ser. No. 16/587,680 entitled "ADAPTIVE REAL-TIME CONVERSATIONAL SYSTEMS AND METHODS", filed Sep. 30, 2019, now U.S. Pat. No. 10,757,256, which is a continuation of U.S. nonprovisional application Ser. No. 16/429,321 entitled "ADAPTIVE REAL-TIME CONVERSATIONAL SYSTEMS AND METHODS", filed Jun. 3, 2019, now U.S. Pat. No. 10,440,181. The contents of application Ser. Nos. 17/313,635, 16/998,316, 16/587,680, and 16/429,321 are hereby incorporated by reference.

BACKGROUND INFORMATION

Agents provide a live interface between a business and its customers. Agents may participate on telephone calls or video conferences in order to generate sales, provide service and support, provide information to market products and services of the business, and/or perform other business functions.

Agents may undergo extensive and expensive training in order to learn about the products and services of the business, and learn best practices or most effective techniques with which to convey that information and/or generate sales. However, agents may forget parts of the training or may veer away from the best practices or trained techniques during a live conversation. The results may include lost sales, poor customer experiences, and/or other undesired outcomes for the business.

Various technologies have been developed to replace or to assist the agents in order to achieve improved conversation outcomes. For instance, U.S. Pat. No. 9,997,158 describes techniques for automatically handing off conversations to specific agents or computer-implemented conversational agents that are best-suited for a conversation topic; U.S. Pat. No. 10,455,378 describes the automatic generation of statistics from a conversation; U.S. Pat. No. 10,798,027 describes automatically generating responses to user communications; and U.S. Pat. No. 10,878,479 describes providing recommendations based on conversation dialog. Nevertheless, problems persist.

DETAILED DESCRIPTION OF PREFERRED EMBODIMENTS

Figure 1:
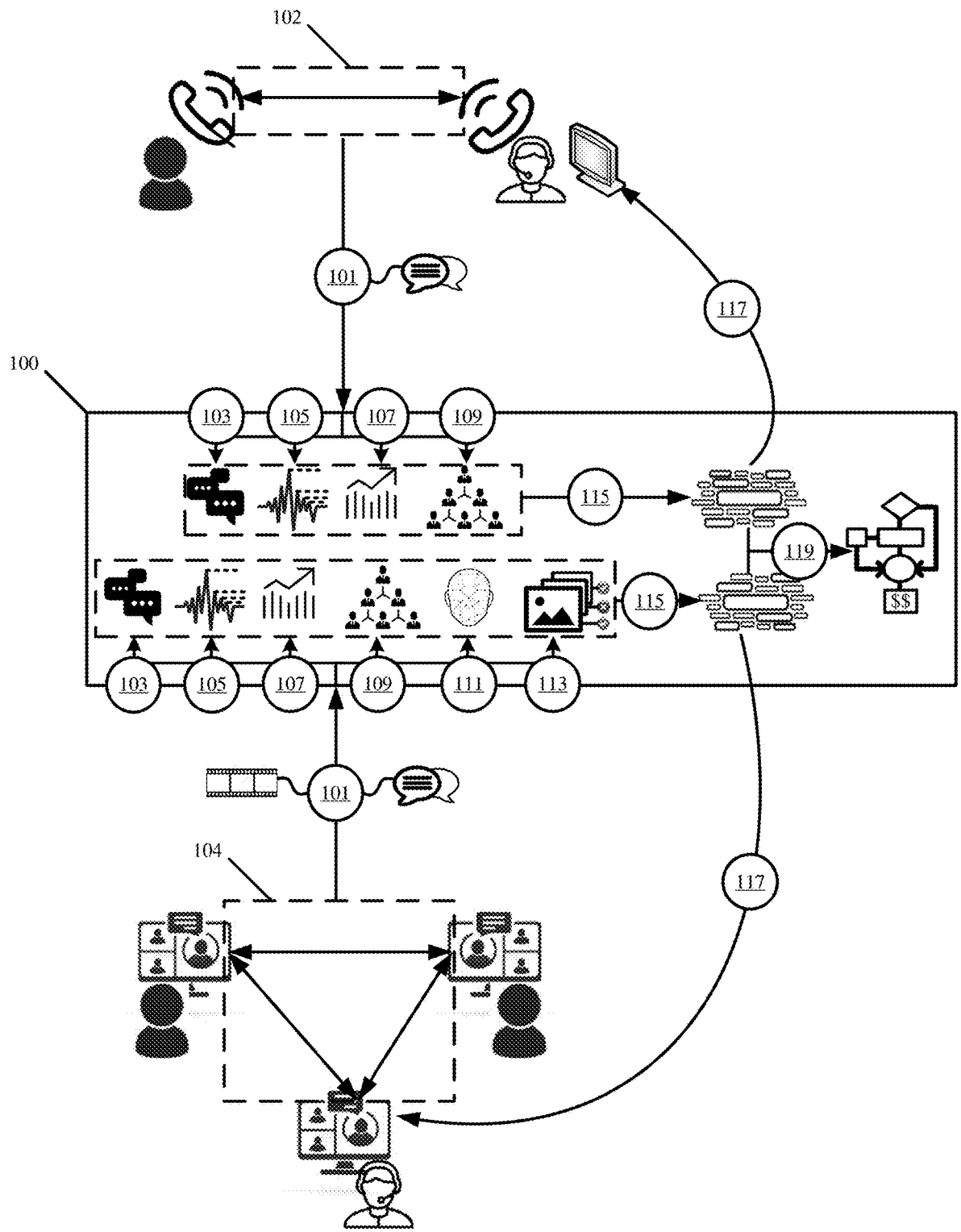
FIG. 1 illustrates an example of the multi-modal conversation monitoring and the dynamic conversation control in accordance with some embodiments presented herein.

The following detailed description refers to the accompanying drawings. The same reference numbers in different drawings may identify the same or similar elements.

Systems and methods, as provided herein, may dynamically control conversations and workflows that are active or ongoing between an agent and one or more participants by performing multi-modal monitoring of the conversations or workflows, by providing dynamically generated actions for achieving a desired outcome based on the current state of the conversation or workflow as determined from patterns within the multi-modal monitoring, and/or by dynamically generating and/or updating plans for future conversations and workflows to improve the likelihood of the conversations and workflows ending with a desired outcome based on the patterns within the multi-modal monitoring. The systems and methods may dynamically control the conversations and workflows by extracting elements that pertain to different monitored modalities from one or more conversations between agents and participants as those conversations are ongoing, using artificial intelligence and/or machine learning ("AI/ML") to recognize patterns within each conversation that match patterns from prior conversations with a variety of outcomes or dispositions, predicting outcomes for the conversations based on the recognized patterns, and/or dynamically generating actions with which to control an active or ongoing presentation from the recognized patterns towards a desired outcome or disposition.

Accordingly, dynamically controlling a conversation may include defining actions that alter the future state of a conversation as the current state of the conversation continues to evolve. The defined actions may be different for each conversation, may change over time, and may be generated for each conversation. Moreover, dynamically controlling a conversation may include defining and/or performing different actions for two conversations with the same or similar state based on other properties that are monitored within the multi-modal conversation monitoring (e.g., different properties of the conversation participants, properties of the agents, time of day, day of week, products that are or were discussed, etc.). The different actions may include providing different scripts and/or instructions for the agents to follow, directing the agents to exhibit different behaviors (e.g., talk slower, lower tone of voice, stop interrupting, pause more frequently during speaking), presenting different information to the agents or participants of the different conversations, providing different notifications to third parties (e.g., managers, other agents, technical support, etc.), and/or other direct and/or indirect interactions with the agents and/or participants.

In some embodiments, the multi-modal conversation monitoring may include tracking conversation state and/or status based on modalities that are derived from or distinct from a spoken text modality. For instance, the monitoring may include generating a first modality based on the spoken words or transcript of the conversation, generating a second modality for sentiment of participants throughout the conversation based on audio tones, vocal queues, facial recognition, and/or detecting mannerisms of the conversation participants, generating a third modality for participant behavior based on interactions of the participants and/or metrics derived from those interactions (e.g., length of uninterrupted speaking, number of interruptions, number of questions asked, length of answers provided in response to different questions, talking speed, reflective listening behaviors, etc.), generating a fourth modality based on participant data obtained from databases, prior interactions with the participants, or external data sources, and/or generating a fifth modality based on presentation reactions of the participants when presented with different products, services, visual exhibits, slides, videos, and/or other information or data are introduced in a conversation.

The systems and methods may include a conversation system that performs the multi-modal conversation monitoring in real-time for live and/or active conversations between different agents and different participants over different conference calls (e.g., telephone calls) or video conferencing streams and/or sessions. The conversation system may simultaneously receive audio and/or video feeds for the live and/or active conversations, and may process the feeds in parallel in order to populate the different modalities for each conversation with conversation elements that are identified or derived from the audio and/or video feeds and that are pertinent to the populated modality.

The conversation system may process the elements extracted to the different modalities of a particular conversation in order to dynamically control the particular conversation while the particular conversation remains active. For instance, the conversation system may dynamically control the particular conversation by generating notifications at specific points in the particular conversation based on the unique set of modality elements that are extracted up to each specific point in the particular conversation. The notifications may instruct the agent to change the topic of conversation, provide different information, engage with different participants, and/or alter speaking behavior and/or mannerisms. The notifications may also be sent to managers, conversation supervisors, and/or other entities that may monitor or provide support to the agent or the conversation. The conversation system may also dynamically control the particular conversation by modifying the flow of the conversation, the materials or content that are presented during the conversation, the next state of the conversation, and/or other changes beyond the manner with which the agent engages the other participants. Accordingly, the conversation system may dynamically control the particular conversation without the agent performing any actions on behalf of the conversation system.

In some embodiments, the conversation system may use AI/ML to recognize patterns of elements from the different modalities that occur at different times during the particular conversation, may compute a likelihood and/or probability that a recognized pattern produces a desired outcome or disposition for the particular conversation end state or for the particular point in the particular conversation, and may dynamically generate one or more controls or actions to improve the likelihood and/or probability of producing the desired outcome or disposition based on the computed probabilities and/or comparison with other patterns from completed conversations. In particular, the conversation system may compare the recognized pattern from the particular conversation to patterns of other completed conversations that successfully achieved the desired outcome or disposition and that involved similar conversation topics, participants, products, services, and/or other common attributes, and may generate the one or more controls or actions based on differences in the compared patterns. In some such embodiments, the conversation system may customize the one or more controls or actions for a particular participant based on past activity and/or past conversations with that particular participant, based on specific insights that are modeled for that particular participant from the past activity or past conversations, and/or based on pending or incomplete actions or states from the past activity or past conversations.

In some embodiments, the conversation system may generate models for different outcome probabilities based on the recognized patterns. For instance, a model may include a matrix with entries for different extracted conversation elements, and with a vector of the matrix corresponding to a recognized pattern formed by a set of extracted conversation elements from the modalities. The matrix entries and/or the matrix vector may further include one or more probability values for the corresponding elements or vector that specify the likelihood of those entries and/or vector leading to a particular outcome.

In some embodiments, the conversation system may use the AI/ML to modify plans for future conversations and/or to provide different controls at the outset or throughout the future conversations that increase the likelihood and/or probability of the future conversations achieving the desired output or disposition. For instance, the conversation system may detect common patterns within elements of completed conversations that yielded a desired outcome, and may modify the plans of future conversations to repeat the detected common patterns in order to achieve the desired outcome. In some such embodiments, the conversation system may detect establishment of a new conversation, may generate an initial pattern based on the modality comprising available data on the participants participating in the new conversation, may select a conversation plan from a plurality of dynamically generated and/or modified conversation plans based on the initial pattern, and may dynamically control the new conversation based on the selected conversation plan.

FIG. 1 illustrates an example of the multi-modal conversation monitoring and the dynamic conversation control provided by conversation system 100 in accordance with some embodiments presented herein. Conversation system 100 may simultaneously receive (at 101) an audio feed of first telephone conversation 102 between a first agent and a first participant, and an audio and video feed of second video conference conversation 104 between a second agent, a third participant, and a fourth participant.

Conversation system 100 may use natural language processing ("NLP"), speech recognition, and/or other audio conversation techniques to populate (at 103) a first modality with a textual transcript of each conversation 102 and 104. The textual transcript may include the words and phrases that are spoken by different speakers at different times during each conversation 102 and 104.

Conversation system 100 may generate (at 105) a second modality based on sentiment that is determined from the textual transcript and/or audible queues at different times and for different speakers of each conversation 102 and 104. Conversation system 100 may generate (at 105) the second modality by analyzing the textual transcript to detect words or phrases associated with different sentiment, and/or by analyzing the audio waveform to detect audible tones and/or patterns that are indicative of different sentiment. For instance, conversation system 100 may detect laughter as an indicator of a happy sentiment, faster speech as an indicator of interest, elevated tones as an indicator of anger, and/or certain keywords or phrases from the textual transcript as an indicator of confusion.

Conversation system 100 may generate (at 107) a third modality based on metrics that are derived from the textual transcript and/or the sentiment extracted from the audio feeds. The metrics may include aggregate counts, computed values, statistics, and/or numerical representations for interactions between the agent and participants, conversation activity, and/or other aspects of the conversations from which the state or outcome of the conversation may be determined. For instance, conversation system 100 may determine the duration that each agent and participant speaks, the number of interruptions, the length of uninterrupted speech by different speakers, the number of questions that are asked by different speakers, the length and comprehensiveness of each answer, the amount and duration of laughter, and/or the amount and duration of other sentiment.

Conversation system 100 may determine the duration that each agent and participant speaks by detecting different tones of voice within the audio feed, and running a timer for each speaker whenever the particular tone of voice of that speaker is detected in the audio feed. Conversation system 100 may compute the number of interruptions based on the number of times the tone of voice changes prior to detecting a pause or break in the audio feed. For instance, an interruption may occur when a first speaker begins talking while a second speaker is talking, or may occur when the first speaker begins speaking within 20 milliseconds of the second speaker's last audio. Similarly, conversation system 100 may detect certain sentiment based on elevated speaking voices, patterns of speech (e.g., laughter, wording, etc.), and/or durations of these various audio queues.

Conversation system 100 may generate (at 109) a fourth modality for conversations 102 and 104 based on information and/or data that is available, searchable, and/or obtained for the agent and each participant in conversations 102 and 104. For instance, conversation system 100 may receive the telephone number, email address, and/or other identifiers for each conversation participant, and may look up the role, position, title, age, income level, education level, and/or other information about the individual associated with the telephone number, email address, and/or other identifier. In some embodiments, the fourth modality may be populated based on names of the participants that are identified in the conversation transcript, voice recognition of the participants in the conversation, geopositioning of the participants' devices, participant device identifiers (e.g., network addressing, login information), and/or data that is obtained or derived from the other modalities. In some embodiments, the individuals' information may be stored in a database based on past conversations with those individuals. In some embodiments, the individuals' information may be obtained from a Customer Relationship Management ("CRM") system or database or via queries to external databases, systems, and/or networks. Conversation system 100 may populate the fourth modality with the experience level, areas of expertise, completed training courses, and/or other information about the agent leading conversation 102 or conversation 104.

Additionally, conversation system 100 may generate the fourth modality to include insights, state information, and/or other activity from past conversations with each participant in conversations 102 and 104. For instance, conversation system 100 may track complete and incomplete actions from past conversations with a particular participant as well as different states that were reached in past conversations with that particular participant. Conversation system 100 may use this historic information to customize the plan for a future conversation with the particular participant, the actions of an ongoing conversation with the particular participant, and/or the actions that follow once an active conversation with the particular participant ends. In other words, the insights, state information, and/or other activity from the particular conversations may be used to avoid repeating actions that were ineffective or previously completed with that particular participant, and instead may be used to customize the current conversation based on the progress that was made in prior conversations or the insights that were learned from the prior conversations.

Conversation system 100 may perform facial recognition and/or mannerism detection to process the video feed of conversation 104, and to populate (at 111) a fifth modality with sentiment that is determined based on the facial expressions and/or mannerisms of each agent or participant. The sentiment that is extracted from the video feed may or may not align with the sentiment that is extracted from the audio feed. For instance, conversation system 100 may detect a particular participant to be happy and engaged at a particular time in the audio feed, but may detect the particular participant to be bored and disinterested at the particular time in the video feed. In some embodiments, conversation system 100 may reconcile the sentiment extracted from the audio feed and the video feed in order to generate a composite sentiment element for each participant at different points in the conversation. In any case, the fifth modality may be populated in response to conversation system 100 receiving a video feed in conjunction with the audio feed for that same conversation.

Conversation system 100 may generate (at 113) a sixth modality for conversation 104 based on a calculated effectiveness of different presentation materials or content that are exhibited and/or presented to the participants. For instance, conversation system 100 may link the presentation of different slides to sentiment expressed by different participants or to different textual reactions of the participants. Accordingly, the sixth modality may measure participant reactions to different presented materials in order to gauge the value of the presented materials in achieving the desired outcome. In some embodiments, the reactions and/or sentiment expressed in response to different conversation activity may be quantified with a score. The score may be subsequentially used in determining the conversation outcome and/or recommending actions with which to control the conversation.

In some embodiments, conversation system 100 may generate (at 113) the sixth modality for conversation 102 based on the audio feed. For instance, conversation system 100 may detect when the agent verbally introduces new products, new services, new pricing, and/or other new information, and may detect the reaction of each participant in response to each newly introduced piece of information based on text captured in the first modality and audio queues captured in the second modality.

In some embodiments, conversation system 100 may generate and/or populate fewer, more, or different modalities based on the conversation taking place and the identification of conversation elements for the different modalities. For instance, conversation system 100 may track conversation or workflow state based on specific names, terminology, features, and/or other wording appearing in the transcript. The conversation state modality may be used to determine if an agent is correctly following a plan or script, is advancing the conversation at a correct pace, is discussing correct topics, is changing the conversation, and/or is performing actions that are likely to produce a desired outcome.

Conversation system 100 may detect (at 115) one or more patterns based on different combinations of elements from the different modalities. In some embodiments, the patterns may include contextual, temporal, causal, and/or other links between the different elements of the different modalities. In some embodiments, the patterns may include a set of elements from different modalities that span a particular amount of time and that relate to one or more events occurring in the conversation before or during that particular amount of time. In some embodiments, conversation system 100 may detect (at 115) the one or more patterns by comparing different sets of elements from the different modalities over different periods of time against previously recognized patterns from other conversations. More specifically, conversation system 100 may detect common patterns in elements from completed conversations that resulted in the same or similar dispositions, and may determine if the extracted elements from conversations 102 or 104 match any of the detected common patterns. In some other embodiments, conversation system 100 may monitor conversations 102 and 104 based on the same or different plans selected for those conversations 102 and 104, and may detect (at 115) the one or more patterns when the extracted elements from conversations 102 and 104 match to or deviate from expected patterns defined for the selected plans. From the comparisons, conversation system 100 may generate a model of outcome probabilities for the different recognized patterns.

Conversation system 100 may dynamically control (at 117) conversations 102 and 104 based on the one or more detected patterns and/or modeled outcome probabilities. Conversation system 100 may dynamically control (at 117) conversations 102 and 104 by changing the topic of conversation (e.g., presenting the agent with a new topic of conversation to discuss), changing the information that is presented during the conversation (e.g., sharing a slide about the new topic of conversation while the conversation is ongoing), changing the behavior of the agent (e.g., instructing the agent to stop interrupting the participants, speak more slowly, ask more questions, etc.), and/or otherwise changing the state or flow of the conversation between the agents and the participants to increase the likelihood or probability of achieving a desired outcome or disposition from the current state or past state represented by the one or more detected patterns.

Conversation system 100 may change the flow of the conversation by providing notifications to a conversation device of the agent. The notifications may instruct the agent to change topics, provide new information, and/or change behavior. Additionally, conversation system 100 may change the flow of the conversation by dynamically modifying a script or plan that is being followed by the agent, or by directly changing the images that are displayed during a video conference. Conversation system 100 may dynamically modify the script or plan to account for past activity and/or past state tracked for the conversation participants, and/or to customize the script or plan based on past preferences and/or reactions of the participants as determined from the past activity and/or past state.

Conversation system 100 may dynamically control (at 119) future conversations based on the one or more detected patterns and/or the outcome of conversations 102 and 104. Conversation system 100 may modify or alter conversation scripts or plans that are followed by the agents to avoid situations that may lead to a negative outcome or disposition, and to define words, phrases, behavior, sequence of topics, a sequence of presentation materials, and/or other best practices that increase the likelihood or probability of achieving a desired outcome or disposition based on the qualities of a particular agent and one or more participants (e.g., experience level, expertise, demographics, demeanor, mannerisms, roles, and/or other individual qualities). Additionally, conversation system 100 may dynamically control (at 119) the future conversations by modifying or altering the conversation scripts or plans for a particular participant to account for attributes (e.g., preferences, behaviors, reactions, etc.) of the particular participant that were determined from the completed conversation, and/or to account for any workflow progression, last conversation state, and/or other activity that is tracked for the particular participant in the completed conversation.

Figure 2:
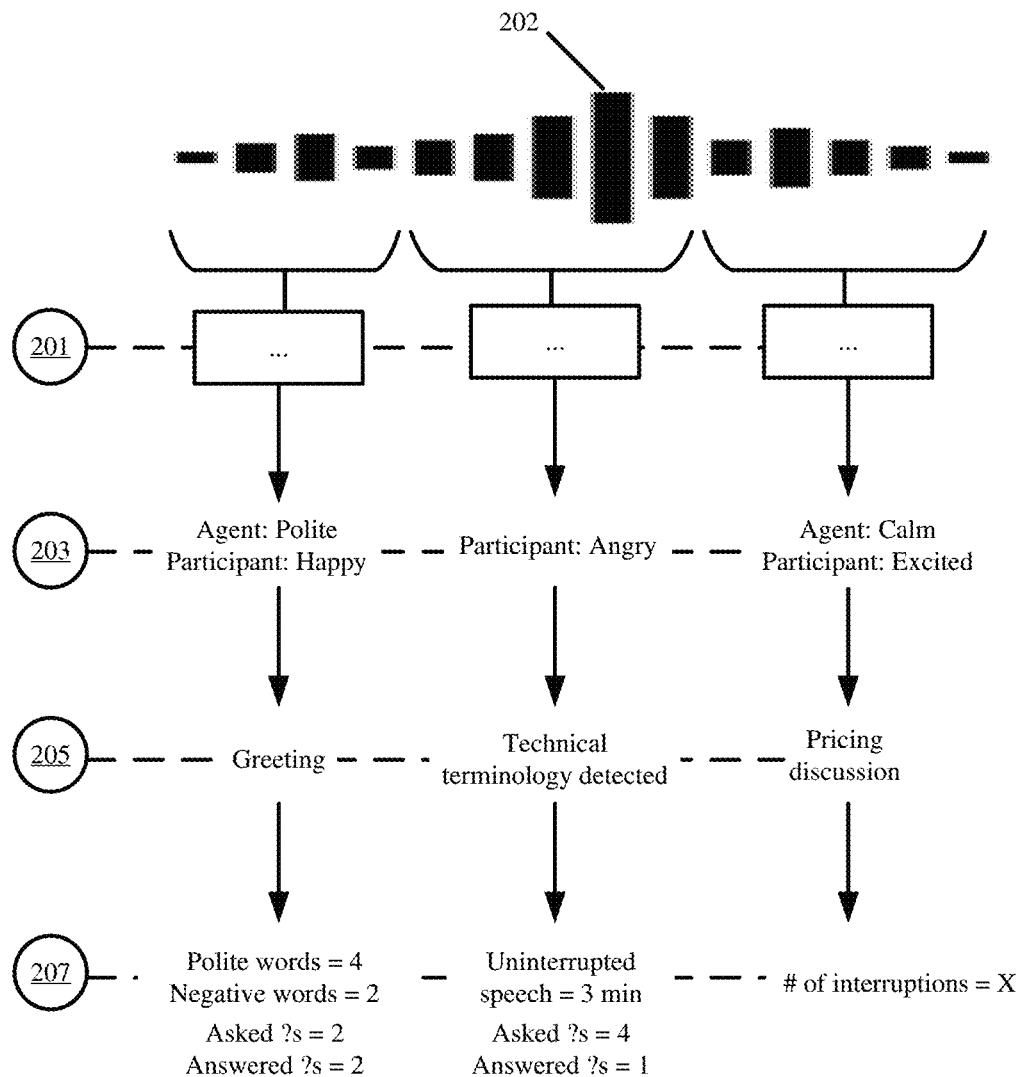
FIG. 2 illustrates an example of populating different modalities based on an audio feed from a conversation in accordance with some embodiments presented herein.

FIG. 2 illustrates an example of populating different modalities based on audio feed 202 from a conversation in accordance with some embodiments presented herein. The analysis of audio feed 202, the identification of the elements for the different modalities, and the generation of the different modalities may be performed by conversation system 100, and may be performed for different audio feeds and/or conversations at the same time and/or in parallel.

As shown in FIG. 2, conversation system 100 may perform (at 201) a real-time transcription of the conversation. The real-time transcription may include determining the words that are spoken by each speaker, agent, or participant in the conversation.

From the wording of the transcript and the audio queues in audio feed 202 that are temporally aligned with when the words are spoken, conversation system 100 may determine (at 203) sentiment of each speaker, agent, and/or participant at different times. For instance, conversation system 100 may characterize the agent's sentiment at the beginning of the conversation as polite based on the transcript including a greeting and responses from the participants indicating their feelings. Conversation system 100 may later detect that the participant has become angry due to an elevated tone of agency, faster speaking, and the use of certain wording of phrasing by the participant.

From the wording of the transcript and the audio queues in audio feed 202 that are temporally aligned with when the words are spoken, conversation system 100 may track (at 205) the conversation state. Conversation system 100 may track (at 205) the conversation state based on wording for a greeting or introduction, wording relating to different topics of conversation, products, and/or services, technical wording that is relevant to a specific product, pricing discussions, names of competitors, etc. From the extracted conversation elements for tracking (at 205) the conversation state, conversation system 100 may assess the agent's behavior, may assess the agent's knowledge and effectiveness, the participant's reactions to different offerings or topics of conversation, progression of the conversation, adherence to a selected plan for the conversation, and/or conversation states from which the disposition of the conversation may be determined.

From the wording of the transcript and the audio queues in audio feed 202 that are temporally aligned with when the words are spoken, conversation system 100 may derive (at 207) conversation metrics. As shown in FIG. 2, the conversation metrics may include the number of polite, friendly, and/or other positive wording or phrasing (e.g., "hello", "how are you", "great to speak with you again", etc.) relative to impolite, unfriendly, and/or other negative wording or phrasing (e.g., "hate", "tired", "bad", etc.) that are used during an initial point in the conversation, the length of uninterrupted speaking time during a second point in the conversation, the number of interruptions during a third point in the conversation, number of questions asked by different speakers, the number of answered questions, and/or metrics about the provided answers (e.g., length of answer, wording for correct answers, etc.).

Figure 3:
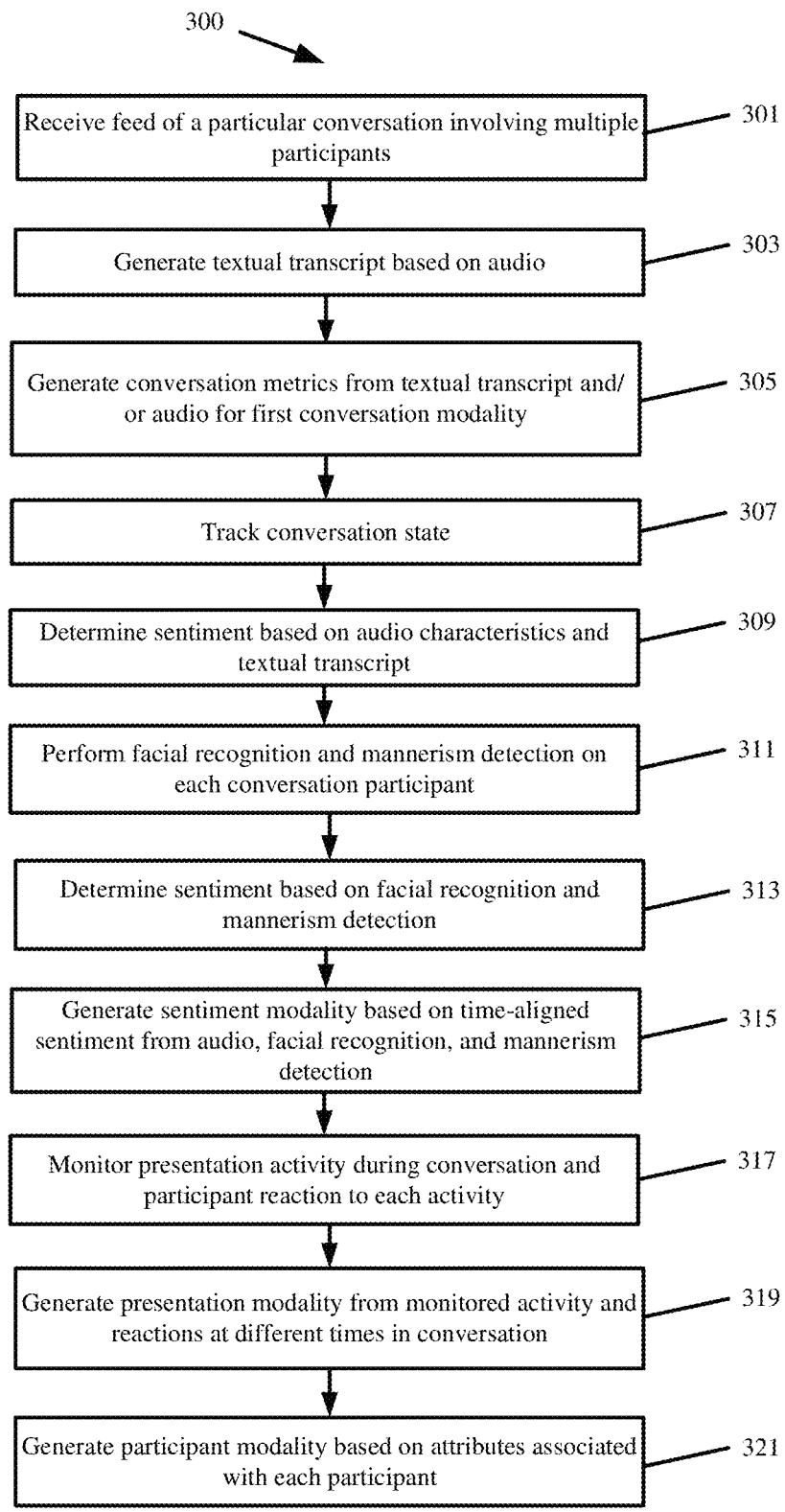
FIG. 3 presents a process for generating different modalities from monitoring a conversation in accordance with some embodiments presented herein.

FIG. 3 presents a process 300 for generating different modalities from monitoring a conversation in accordance with some embodiments presented herein. Process 300 may be performed by conversation system 100.

Process 300 may include receiving (at 301) a feed of a particular conversation involving multiple participants. The participants may include individuals that represent a business (e.g., an agent or business representative) and individuals that are not affiliated with the business (e.g., a customer or potential customer). Depending on the particular conversation type, the feed may include audio only, video only, or a combination of audio and video. The video component may include video of each participant during the particular conversation and/or materials that are presented apart from the video of each participant.

In some embodiments, conversation system 100 may be integrated as part of a sales system, customer management system, and/or other systems that connects external parties to different agents of a business and vice versa. Conversation system 100 may therefore detect the establishment of every incoming or outgoing call, conference, or conversation, and may connect to the audio and/or video feed of that call, conference, or conversation. In some embodiments, all call, conferences, or conversations may be routed through conversation system 100 in order for conversation system 100 to receive (at 301) the feed of each conversation.

Process 300 may include generating (at 303) a textual transcript based on the audio from the particular conversation. Conversation system 100 may perform NLP and/or other speech recognition to determine the words or phrases that are spoken, and the different speakers that recite the words or phrases. In some embodiments, conversation system 100 may populate a first modality based on the wording and phrasing from the textual transcript.

Process 300 may include generating (at 305) conversation metrics from the textual transcript and/or audible queues from the audio feed. More specifically, the conversation metrics may include counts or statistics of different audio events that occur during the particular conversation, and/or values that are derived from the transcript and/or the audible queues.

The audible queues may include the speaker's tone, pitch, frequency, loudness, inflection, and/or sound characteristics. For instance, conversation system 100 may detect the number of questions asked by a particular speaker based on the wording used by that speaker, and also the inflection in the speaker's voice. Similarly, conversation system 100 may determine the number of interruptions based on the number of times the speaker changes without a period of silence (e.g., 300 milliseconds of silence) or without a specific period of time in which the volume drops below a threshold volume.

The conversation metrics may further include counting the number of times certain words or types of words (e.g., words with positive connotations) are used by different speakers. For instance, the conversation metrics may reveal whether a product demonstration was offered, the number of times different product names were mentioned, and/or whether competitors were mentioned. In some embodiments, conversation system 100 may populate a second modality based on the conversation metrics. Accordingly, conversation system 100 may derive some of the conversation metrics based on patterns in the audio feed and/or the transcription of the audio feed.

Process 300 may include tracking (at 307) conversation state. Conversation system 100 may track (at 307) conversation state based on the transcript, the audible queues, and/or the conversation metrics. For instance, the conversation state may be tracked (at 307) based on the presence or absence of certain names, features, identifiers, phrases, and/or other words in the transcript. The conversation state may also be tracked (at 307) based on changes in the materials presented in the video feed.

Process 300 may include determining (at 309) sentiment based on the transcript, the audible queues, and/or the conversation metrics. The presence of certain words in the transcript may be indicative of happiness, interest, disinterest, boredom, confusion, anger, shock, and/or other sentiment. Similarly, the raising or lowering of one's voice, the speed with which one speaks, the change in a speaker's tone, the length of uninterrupted speaking time, the number of interruptions, the length of answer to a question, and/or wording, audible queues, and/or conversation metrics may be used to determine (at 309) the sentiment of different speakers or participants at different times during the particular conversation. In some embodiments, conversation system 100 may be trained and/or configured to determine (at 309) the sentiment based on the spoken words, audible queues, and/or the conversation metrics.

Process 300 may include performing (at 311) facial recognition and mannerism detection on each participant and/or agent in the particular conversation if the received (at 302) feed includes video or a visual component. Performing (at 311) the facial recognition may include detecting expressions and changes in the facial expressions of each participant, and also detecting body language or body movements that are indicative of certain sentiment (e.g., crossing of arms, looking away from the camera, rubbing or scratching of body parts, etc.).

Process 300 may include determining (at 313) sentiment based on the output of the facial recognition and mannerism detection. For instance, conversation system 100 may perform a mapping between different detected facial expressions or mannerisms and different sentiment. The sentiment may include expressions of happiness, anger, interest, disinterest, confusion, frustration, trust, distrust, anxiety, and/or other emotions. In some embodiments, determining (at 313) the sentiment may include matching patterns from the video feed against patterns of different facial expressions or mannerisms that correspond to different sentiment.

Process 300 may include generating (at 315) a sentiment modality based on the sentiment that is determined (at 309) from the audio feed and the sentiment that is determined (at 3113) from facial expressions and/or mannerisms that are time-aligned with the determined (at 309) audio sentiment. The time-alignment of the sentiment determined from the audio and video feeds may be used to verify the sentiment at the time, to more accurately determine the sentiment at the time, and/or to define different sentiment for a speaker at the time. For instance, the sentiment determined (at 309) from a particular time in the audio may be classified as either boredom or confusion. However, the sentiment determined (at 313) from the facial expressions at the particular time in the video may support classifying the sentiment at the particular time as confusion instead of boredom. In some embodiments, the sentiment modality may include sentiment that is derived from the audio and the video for each participant at different times, or may include first sentiment derived from the audio and second sentiment derived from the video for each participant at the different times.

Process 300 may include monitoring (at 317) presentation activity during the conversation and the participant reactions to the presentation activity. The presentation activity may include verbal or visual changes that occur during the conversation. The presentation activity may include changing the topic of conversation from a first product to a second product, from a product introduction to product pricing, from description of a customer issue to a provided solution, and/or changes that may be initiated by the agent or any of the conversation participants. The changes in the conversation may occur verbally as a result of spoken words, or visually as a result of new materials being shared or presented between the conversation participants.

Conversation system 100 may perform a sentiment analysis whenever a change in the presentation activity is detected in order to determine if the presentation activity change positively or negatively impacted the conversation. Process 300 may include generating (at 319) a presentation modality based on the participant reactions to the changes in the presentation activity. The presentation modality may also include entries that are not based on any changes in the presentation activity. For instance, conversation system 100 may determine that a particular topic of conversation has been ongoing for a particular amount of time, and may determine changes in the participant sentiment from the beginning to the end of that particular topic of conversation. The presentation modality may therefore identify a first set of conversation sequences that produce positive results, a second set of conversation sequence that produce negative results, and specific presentation activity that yielded positive or negative results and/or that contributed positively or negatively to the final outcome or disposition of the conversation.

Process 300 may include populating (at 321) a participant modality based on any information that is obtained or learned for the agent and/or participants. Conversation system 100 may obtain information about the participants based on a telephone number, email address, or other identifier that the participants use to join the conversation. Conversation system 100 may query databases, search engines, and/or other data repositories for information about the participants using the participant identifiers. Additionally, from the transcript and questions asked by the agent, conversation system 100 may determine age, occupation, demographics, and/or other identifying information about individual participants that may be entered in the participant modality. Conversation system 100 may also enter preferences of the individual participants or create a participant profile in the participant modality based on the elements that are entered into the other modalities, and/or may track a conversation state that is reached with different individual participants in the participant modality.

In some embodiments, process 300 may generate additional modalities based on additional elements that may be extracted or derived from the audio and/or video feed of a conversation. The different modalities may store conversational elements that extend beyond the spoken words.

Conversation system 100 may use the extracted conversation elements from the different modalities in order to determine the status and/or outcome for different parts of the conversation and for the conversation as-a-whole at the completion of the conversation. Conversation system 100 may dynamically control an ongoing conversation based on the determined status and/or outcome at different parts of that conversation, and/or may adjust plans for controlling subsequent conversations based on the determined status and/or outcome of a completed conversation.

In some embodiments, conversation system 100 may determine the conversation status and/or outcome by comparing different combinations of conversational elements from the different modalities at different times throughout the conversation against patterns within completed conversations that resulted in the same or similar outcomes. In some embodiments, the one or more patterns may be part of a plan that conversation system 100 automatically defines to achieve a desired outcome. Conversation system 100 may compare the different combinations of conversational elements from the different modalities at different times throughout a particular conversation against the one or more patterns of the plan in order to determine if the particular conversation is adhering to the plan and is likely to yield the desired outcome of the plan definition, or if the particular conversation is deviating from the plan definition in which conversation system 100 may assert control over the conversation by performing one or more actions to realign the particular conversation with the plan definition and increase the probability of the particular conversation producing the desired outcome of the plan.

Conversation system 100 may dynamically determine the patterns using AI/ML. Conversation system 100 may use AI/ML to detect sets of conversation elements from different modalities that are present in completed conversations achieving the same or similar positive or desired outcome, and that are absent from completed conversations that achieved negative or undesired outcomes or dispositions. The patterns may therefore represent best practices or results of best practices for achieving the desired outcome.

Figure 4:
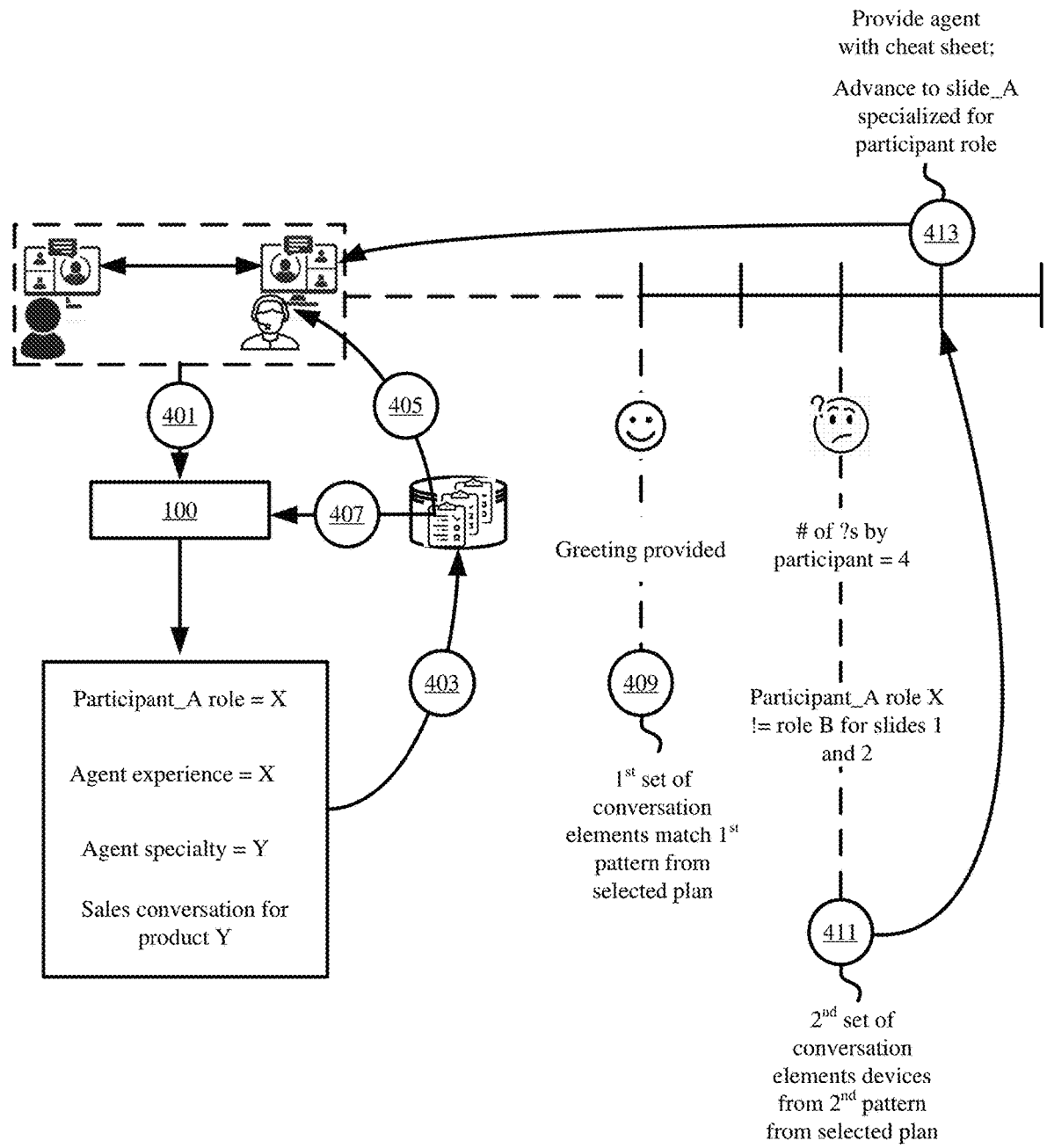
FIG. 4 illustrates an example of dynamically controlling an active conversation in response to detecting a pattern of conversation elements from different modalities of the active conversation that deviate from a determined pattern for achieving a desired outcome in accordance with some embodiments presented herein.

FIG. 4 illustrates an example of dynamically controlling an active conversation in response to detecting a pattern of conversation elements from different modalities of the active conversation that deviate from a determined pattern for achieving a desired outcome in accordance with some embodiments presented herein. Conversation system 100 may receive (at 401) a feed for a new conversation between an agent and one or more participants. Conversation system 100 may select (at 403) a plan for achieving the desired outcome based on attributes of the agent, the one or more participants, and/or an objective of the conversation (e.g., selling of a particular product). The plan may specify various actions for controlling the conversation and/or for achieving the desired outcome with an expected probability. The actions may be defined as patterns of conversation elements for different modalities, and/or a set of operations that result in the patterns of conversation elements for the different modalities. For instance, the plan may specify an order or sequence for conversation topics, products, information, and/or subject matter that the agent is to discuss with the participant, an order or sequence for certain language to use during the conversation, certain behavior to exhibit at certain times, and/or materials (e.g., slides, presentations, videos, websites, etc.) to present to the participant at different times or points within the conversation. Conversation system 100 may provide (at 405) the plan to the agent in order to direct actions of the agent for the conversation, and may configure (at 407) patterns from the plan to verify that the conversation is following the plan and progressing through the actions, workflows, and/or best practices that have the greatest probability, as determined by the AI/ML, to produce the desired outcome.

Conversation system 100 may begin the multi-modal monitoring and conversation element extraction for the different modalities at the start of the conversation. At a first time that coincides with the start of the conversation, conversation system 100 may determine (at 409) that the participant exhibits a happy sentiment based on one or more conversation elements from the sentiment modality, and that the agent has provided the proper greetings and introduction based on wording from the transcript and/or metrics for greeting words found in the conversation metrics modality. Accordingly, conversation system 100 may determine (at 409) that the conversation begins with a first set of conversation elements that match a first pattern within the plan for producing the desired outcome. In other words, conversation system 100 may determine (at 409) that the conversation is proceeding according to the plan, and therefore satisfies a first set of conditions for achieving the desired outcome.

Conversation system 100 may determine (at 411) that the conversation elements from the different modalities at a later second time deviate from a pattern of conversation elements specified for the second time in the selected plan. For instance, conversation system 100 may determine (at 411) that the participant sentiment has changed to confused instead of an interested or attentive sentiment specified in the plan at the second time, may determine (at 411) that the number of questions asked by the participants during the second time exceeds a desirable threshold or number of questions in the plan, may determine (at 411) that the questions are directed to first and second slides that are presented to the participants during the second time based on conversation elements from the presentation modality, and may determine (at 411) that the role of the participant is misaligned with the subject matter contained in the first and second slides based on the plan specifying the first and second slides for a participant with a different role than the role associated with the participant of the active conversation. Consequently, the set of conversation elements from the different modalities of the active conversation at the second time may produce a pattern that indicates the conversation is headed to a negative outcome or is deviating from the pattern that produces the desired outcome with the greatest probability.

Conversation system 100 may dynamically assert control over the conversation to redirect the conversation towards the desired outcome. More specifically, conversation system 100 may dynamically control the conversation based on the evolving current state of the conversation, and may induce a change in the conversation that causes the conversation to more closely adhere to the plan, thereby increasing the likelihood of achieving the desired outcome. Conversation system 100 may dynamically control the conversation by determining which conversation elements extracted at or up to the second time deviate from the pattern of the plan defined for the second time, generating actions based on the deviation of the conversation elements at or up to the second time in the conversation and a desired outcome for the conversation, and performing (at 413) the one or more actions.

As shown in FIG. 4, conversation system 100 may provide (at 413) the agent with additional information about the subject matter identified in the questions asked by the participant and/or the subject matter found in the first and second slides. Moreover, rather than advance the conversation to a next third slide in the presentation, conversation system 100 may dynamically alter (at 413) the conversation sequence by advancing to a fifth slide that contains information that is relevant to the role of the participant. In other words, conversation system 100 may dynamically alter (at 413) the flow of the conversation by detecting that the participant has become confused based on the sentiment from the sentiment modality, the number of questions from the conversation metrics modality, and the role of the participant as determined from the participant modality. For this particular state (e.g., the confused participant having a specific role, the dialog leading to the confusion, etc.) and for modifying the particular state to a desired outcome, dynamically altering (at 413) the flow of the conversation may include dynamically changing the order or sequence for the materials that are presented in the video feed, changing the script that is followed by the agent, and/or directing the agent to advance the conversation from the subject matter of the second slide to the subject matter of the fifth slide to regain the interest of the participant and present subject matter that is more relevant to that participant.

Conversation system 100 may continue to monitor the conversation elements from the different modalities of the active conversation, and may determine that the exerted control over the conversation has produced a positive effect as a result of the participant exhibiting a happy sentiment after the presentation and discussion of the fifth slide. Conversation system 100 may exert further control over the active conversation, and/or may perform additional actions to alter the conversation in response to detecting patterns of conversation elements from the different modalities that deviate from sets of conversation elements of prior conversations that yielded positive or desired outcomes.

Figure 5:
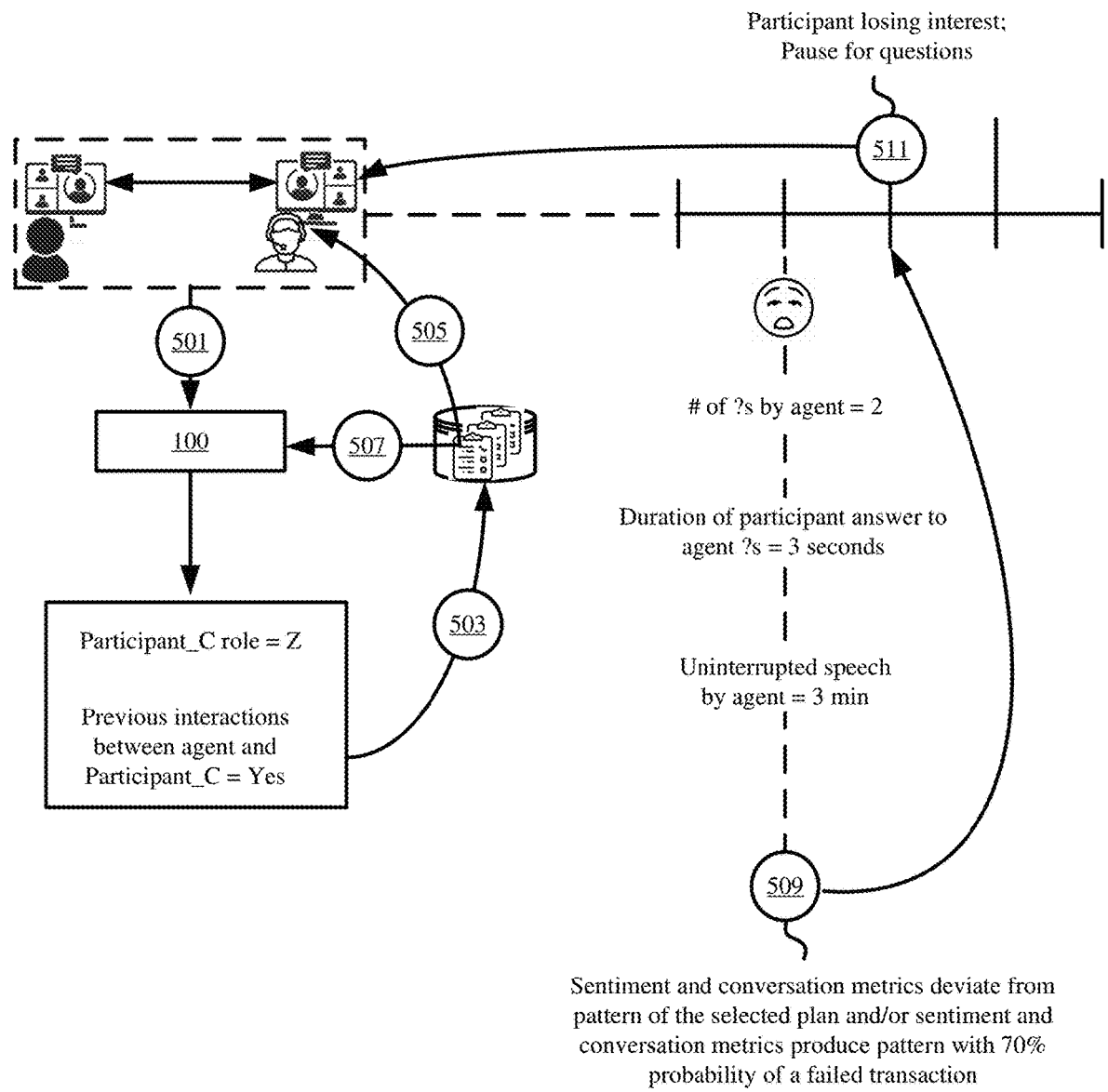
FIG. 5 illustrates an example of dynamically controlling an active conversation based on a different pattern of conversation elements detected in the different modalities in accordance with some embodiments presented herein.

FIG. 5 illustrates an example of dynamically controlling an active conversation based on a different pattern of conversation elements detected in the different modalities in accordance with some embodiments presented herein. Once again, conversation system 100 may receive (at 501) a feed for a new conversation between an agent and one or more participants, and may select (at 503) a script or plan to control the new conversation based on an initial set of attributes of the agent and the one or more participants.

Conversation system 100 may provide (at 505) the selected plan to the agent, and the agent may initiate and advance the conversation based on operations and/or controls specified in the plan. Conversation system 100 may configure (at 507) the selected plan, and may use the patterns from the plan to determine if the conversation is adhering to the selected plan and therefore likely to will achieve the desired outcome with the probability that was determined for the plan.

Conversation system 100 may perform the multi-modal monitoring, and may extract conversation elements to different modalities as the conversation unfolds. At a particular point or up to the particular point in the conversation, conversation system 100 may detect (at 509) a set of conversation elements that deviate from a defined pattern of the plan. As shown in FIG. 5, the set of conversation elements may include a disinterested sentiment that is populated in the sentiment modality based on facial expressions and audible tones of the participant at or before the particular point in the conversation, and metrics from the conversation metrics modality at or before the particular point in the conversation that demonstrate the level of engagement by the participant falling below a desired threshold. For instance, the metrics may reveal that the number of questions asked by the agent to engage the participant is less than a first threshold, the amount of speaking time by the participant relative to the speaking time of the agent is less than a certain percentage, the length of answers to questions posed to the participant by the agent are less than a second threshold, and/or the time of uninterrupted speaking by the agent has exceeded a third threshold. The particular point in the conversation may correspond to a point in the plan at which features of a particular product are discussed, and the pattern defined in the plan for that particular point in the conversation may specify an interested sentiment for the participant, the number of questions asked by the agent to be greater than the first threshold, the amount of speaking time by the participant relative to the speaking time of the agent to be more than the certain percentage, the length of answers to questions to be greater than the second threshold, and the time of uninterrupted speaking by the agent to be less than the third threshold.

Accordingly, the deviation of the conversation from the plan may decrease the probability of achieving the desired outcome set for the plan (e.g., a completed sales transaction) and/or may increase the probability of achieving a different outcome (e.g., a lost sales opportunity). Alternatively, in some embodiments, the sentiment and metrics extracted at the particular point in the conversation may match a pattern that in 70% of previously completed conversations has resulted in no completed sale.

In response to the detected (at 509) deviation from the plan and/or conversation elements matching a pattern with an undesired outcome, conversation system 100 may perform (at 511) one or more actions to alter the flow of the conversation and to change the pattern to include conversational metrics from previously completed conversations that have resulted in the desired outcome (e.g., completed sales). Conversation system 100 may generate the one or more actions based on pattern recognition and machine learning of past actions in prior conversations that successfully transitioned those prior conversations for the same or similar state to the desired outcome.

As shown in FIG. 5, conversation system 100 may notify (at 511) the agent to pause speaking, and to reengage the participant by asking questions. Conversation system 100 may provide (at 511) the exact questions that the agent should use to reengage the participant based on the transcript of the conversation so far, the conversation topics, and/or known interests or likes of the participant as determined from the participant modality. The questions may change the topic of the conversation, may simplify the conversation, may include offers for a demonstration, pricing reduction, and/or other incentives that may be of interest to the participant. Additionally, or alternatively, conversation system 100 may notify a conversation supervisor about the state of the conversation and/or may directly connect the supervisor to the conversation so that the supervisor may assist the agent in correcting the plan deviation. Conversation system 100 may continue to monitor the conversation in order to detect if the performed actions were effective in populating the different modalities with conversational elements that match subsequent patterns from the plan and/or that produce patterns with an improved likelihood of achieving a desired disposition.

As shown in FIGS. 4 and 5, conversation system 100 may dynamically control active and/or ongoing conversations by invoking and/or implementing actions that alter the flow of the conversations while the conversations are active and/or ongoing based on different current states of those conversations and different desired outcomes for those conversations. In other words, conversation system 100 may perform actions that may change the outcome of a conversation based on the multi-modal monitoring and pattern recognition.

In some embodiments, conversation system 100 may control conversations that have ended and/or that did not produce a desired outcome based on the multi-modal monitoring and pattern recognition. In some such embodiments, conversation system 100 may perform actions that reduce the future likelihood of an undesirable outcome.

Figure 6:
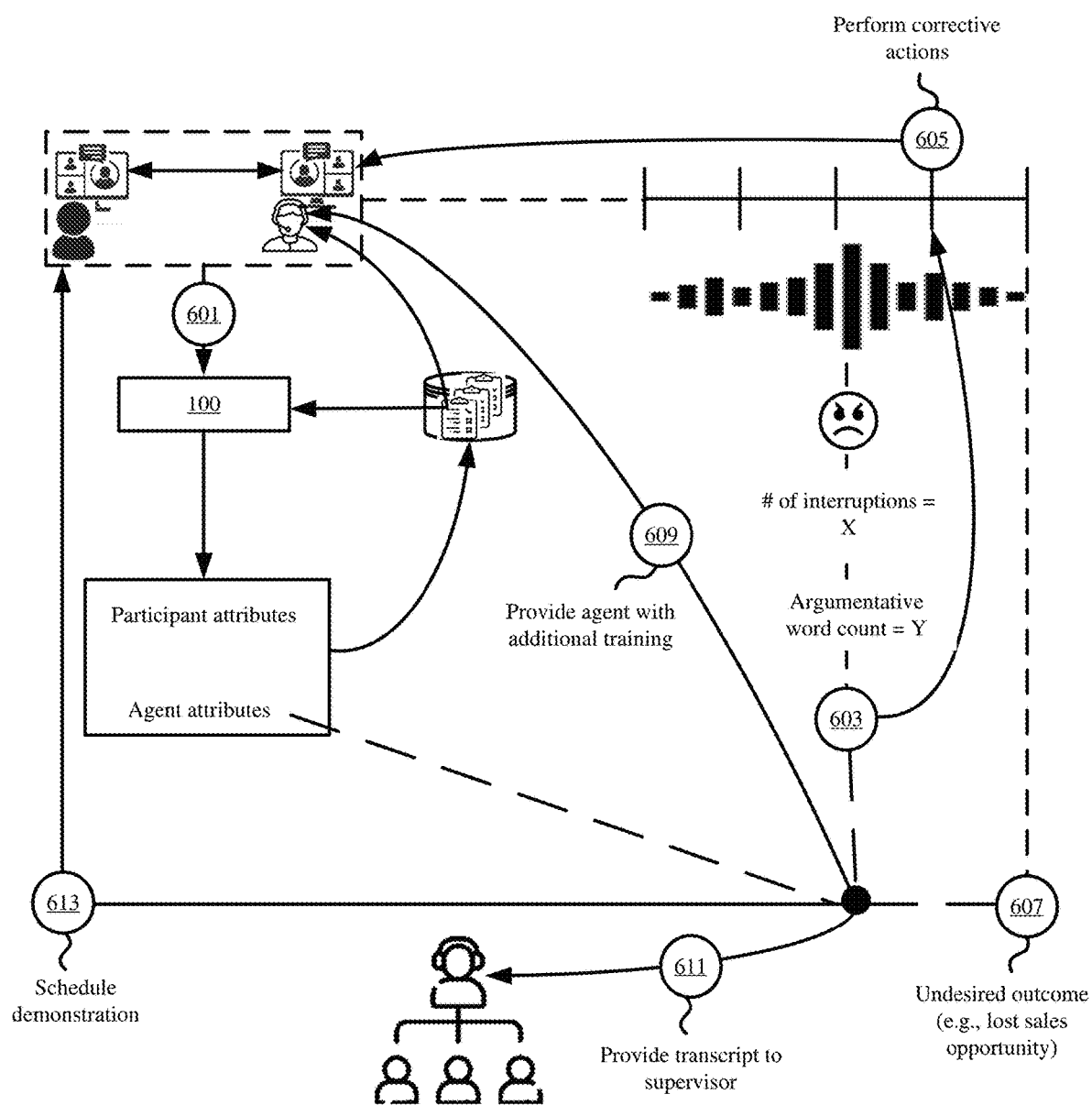
FIG. 6 presents an example of the conversation system dynamically controlling a conversation upon completion of the conversation in accordance with some embodiments presented herein.

FIG. 6 presents an example of conversation system 100 dynamically controlling a conversation upon completion of the conversation in accordance with some embodiments presented herein. Conversation system 100 may receive (at 601) a feed of a conversation, and may perform the real-time multi-modal monitoring of the conversation to populate the modalities with different conversation elements from different points in the audio and/or video of the conversation.

Conversation system 100 may detect (at 603) a set of conversation elements during a point in the conversation that deviates from a pattern defined for that point in the conversation within a selected plan, and/or may detect (at 603) a set of conversation elements that form a previously recognized pattern with a probability of leading to a negative disposition. For instance, the set of conversation elements at the point in the conversation may include angry sentiment that is determined from audio queues (e.g., elevated voice, speaking speed, etc.), wording within the transcript, facial expressions, and/or mannerisms. The pattern may further include metrics that support the angry sentiment. For instance, the metrics may identify an increased number of interruptions, and an increased number of words with negative connotations.

As before, conversation system 100 may dynamically control (at 605) the conversation while the conversation is ongoing by notifying the agent to stop interrupting the participant, to express understanding of the participant's position, to change the conversation topic, to provide incentives that may deescalate the anger, and/or to perform other actions. Nevertheless, conversation system 100 may determine (at 607) that the conversation ends with an undesired outcome and/or a negative disposition.

Conversation system 100 may dynamically control (at 609) the conversation upon or after its conclusion based on different sets of conversational elements that were generated for the different modalities of that conversation. In particular, conversation system 100 may dynamically control (at 609) the conversation upon or after its conclusion by performing a first set of actions that are directed to the agent involved in that conversation, and/or by performing a second set of actions that are directed to the third-party participant or the plan.

For instance, one or more sets of the conversational elements from the different modalities may match a behavioral pattern for an inexperienced or improperly trained agent. Accordingly, conversation system 100 may perform (at 609) an action to further train the agent on certain products, best practices, sales techniques, etc. One or more sets of the conversational elements from the different modalities may match a behavioral pattern for an agent that does not follow protocol or the plan that was selected for that conversation by conversation system 100. In this case, conversation system 100 may send (at 611) a notification, alert, email, or message to the agent's supervisor with a transcript of the conversation for the supervisor to review. In some embodiments, conversation system 100 may automatically generate a summary of the completed conversation. The summary may highlight points within the conversation that deviated from the plan, various conversation elements that deviated from the plan, unexpected interactions between the agent and the participants, and/or the disposition of the conversation.

In addition to the actions that are directed at the agent, conversation system 100 may perform different actions that are directed to the participant with the purpose of maintaining the participant as a potential lead or customer. In some such embodiments, conversation system 100 may generate a first behavioral model for the agent and a second behavioral model for the participant based on extracted elements from the conversation. The first behavioral model may include the recognized patterns of the agent deviating from the plan and/or other patterns of an inexperienced or improperly trained agent. The second behavioral model may include recognized patterns where the participant expressed interest and where the participant was uninterested. For instance, one or more sets of conversational elements from the different modalities may match a pattern for following up with the participant on a particular product that the participant expressed interest in. Accordingly, conversation system 100 may schedule (at 613) a demonstration of the particular product that the participant expressed interest in, or may send an email or message on behalf of the agent to the participant to thank the participant for his/her time, provide additional information that was not discussed about the particular product, and/or offer an incentive to complete a transaction (e.g., a coupon code) for the particular product.

Additionally, conversation system 100 may combine and/or compare the first behavioral model and the second behavioral model to improve the outcome of future conversations with that participant or participants with similar attributes. For instance, conversation system 100 may select a different agent to initiate a future conversation with that participant, participants with similar attributes, and/or for conversations involving certain subject matter based on the comparison of different first behavioral models for different agents and the second behavioral model of the participant. From the comparison, conversation system 100 may determine one or more agents that have a particular skillset, training, demeanor, and/or other attributes for producing a desired result with a participant having a particular set of attributes. Conversation system 100 may use the selection of agents when establishing or routing a future set of conversations. Alternatively, conversation system 100 may provide the selection of agents for future conversations to a supervisor or deal owner, and the supervisor or deal owner may manage which agents are used for the future conversations (e.g., reassign agents to different deals, provide additional support to the agents, provide recommended actions for the agents on future conversations, etc.).

In some embodiments, conversation system 100 may automatically remove the participant from a contact list or a lead list in response to a set of conversation element (e.g., sentiment, metrics, audible queues) that is associated with a low probability (e.g., <20%) of generating a sale with the participant. In some such embodiments, the second behavioral model that is generated for the participant may indicate no interest or a very low conversation rate for the offered goods or services, or the comparison of the first behavioral model for the agent and the second behavioral model for the participant may indicate that the agent properly followed the plan and that the participant had no interest in the offered goods or services despite the agent following the best practices set forth in the plan.

Conversation system 100 may use AI/ML to recognize different patterns of conversation elements from the different modalities that appear in conversations with the same or similar outcomes, and to model the probability of each pattern producing one or more outcomes. The pattern recognition and/or probability modeling may be used to forecast sales and/or other future outcomes, analyze effectiveness of different agents, verify analytics provided by different agents, define actions with which to control different conversations, and/or define plans with the greatest probabilities of achieving different outcomes with different participants, different agents, and/or different products or services.

Figure 7:
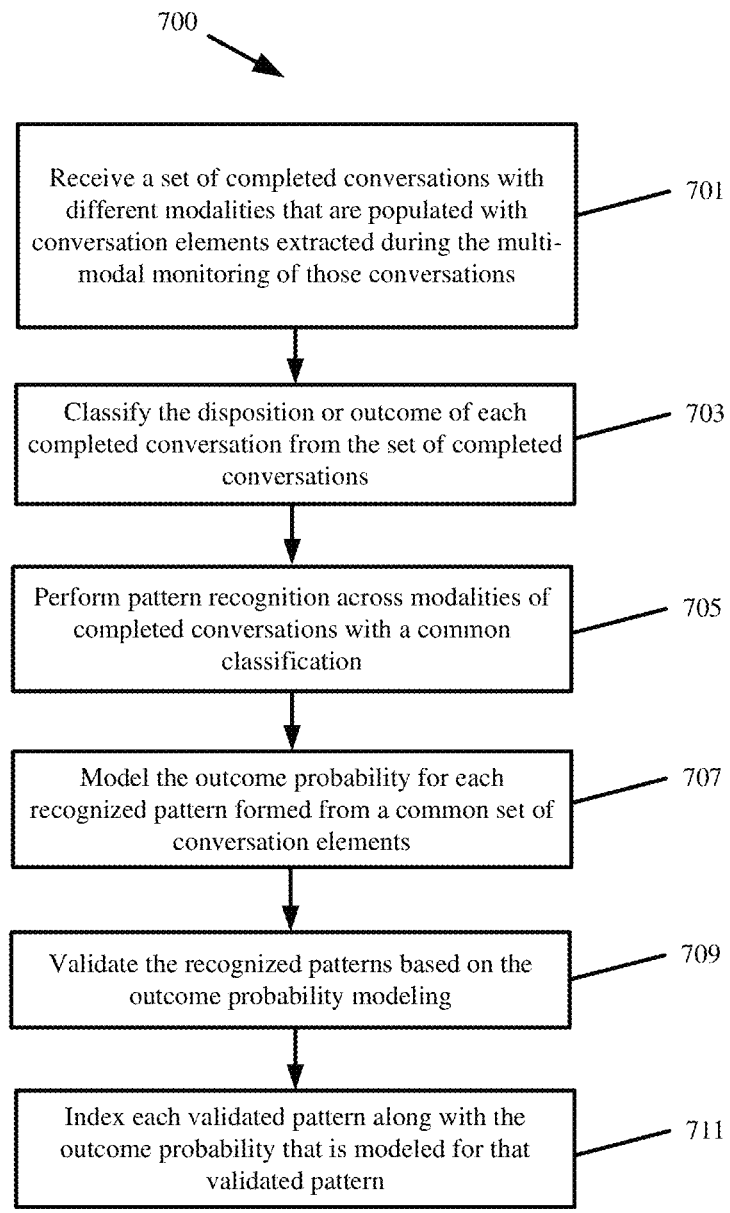
FIG. 7 presents a process for using artificial intelligence and/or machine learning to recognize different patterns and to model the outcome probability for each recognized pattern in accordance with some embodiments presented herein.

FIG. 7 presents a process 700 for using AI/ML to recognize different patterns and to model the outcome probability for each recognized pattern in accordance with some embodiments presented herein. Process 700 may be implemented by conversation system 100.

Process 700 may include receiving (at 701) a set of completed conversations with different modalities that are populated with conversation elements extracted during the multi-modal monitoring of those conversations by conversation system 100. In some embodiments, conversation system 100 may store completed conversations and the populated modalities for those conversations to a datastore, and may periodically receive (at 701) the set of completed conversations from the datastore for batch processing (e.g., at the end of the day). The received set of completed conversations may include all conversations conducted throughout the existence of a business, or may include a most recent set of completed conversations over a given period of time (e.g., last month, last quarter, last year, etc.).

Process 700 may include classifying (at 703) the disposition or outcome of each completed conversation from the set of completed conversations. Classifying (at 703) the disposition may include examining the outcome of each completed conversation to determine if one or more end states were achieved. The end states may include a simple binary classification of positive or negative, or may include more granular classifications such as completed sale, interested, pending deal, pricing phase, disinterested, competitor advantage, and/or other outcomes that fit different business workflows. The end states may be determined from the conversation elements of each conversation, tags or notes defined by the agent for each conversation, and/or entries for the conversations in other systems (e.g., sales system, order fulfillment system, CRM system, etc.).

Process 700 may include performing (at 705) pattern recognition across modalities of completed conversations with a common classification (e.g., same or similar classification). The pattern recognition may include scanning the modalities for a common set of conversation elements that are generated in some common sequence, at some common time, and/or for a common set of participant attributes in at least two or more conversations with the common classification. For instance, a pattern may include first sentiment exhibited by a participant at a first time, first behavior exhibited by the agent at a second time, data that is presented during a third time, keywords spoken during a fourth time, one or more conversation metrics detected by a fifth time in a particular conversation.

Process 700 may include modeling (at 707) the outcome probability for each recognized pattern formed from a common set of conversation elements. Modeling (at 707) the outcome probability may include determining a first percentage or probability with which each recognized pattern is found in the modalities of completed conversations with the common classification, in the common sequence, at the common time, and/or for the common set of participant attributes, and also a second percentage or probability with which each recognized pattern is found in the modalities of completed conversations with other classifications, with other sequencing, with other timing, and/or for other sets of participant attributes. For instance, a particular pattern may be found with a 70% probability in conversations that ended with a completed sale, and with a 25% probability in conversations that ended without a completed sale.

In some embodiments, the modeling (at 707) may include generating different models based on a first set of conversation elements produced by or relating to the conversation agent, and based on a second set of conversation elements produced by or relating to the conversation participant(s). For instance, the modeling (at 707) may include determining a first outcome probability for a first set of patterns that are recognized within the first set of conversation elements, determining a second outcome probability for a second set of patterns that are recognized within the second set of conversation elements, using the first outcome probability to model the behavioral profile of the agent, and using the second outcome probability to model the behavioral profile of the participant.

Process 700 may include validating (at 709) the recognized patterns based on the outcome probability modeling (at 707). For instance, conversation system 100 may delete or discard a pattern in which the second percentage of finding the pattern in other classified conversations is greater than the first percentage of finding the same pattern in conversations with the same classification. Similarly, conversation system 100 may delete or discard a pattern in which the first percentage is less than a threshold percentage. For instance, if a particular pattern results in a particular outcome in less than half of the conversations with that particular outcome, then the AI/ML may determine that the particular pattern has an insignificant impact on that particular outcome. However, if a particular pattern is found in 75% of conversations with a particular common outcome, and is found in less than 30% of conversations with other outcomes, then the AI/ML may validate (at 709) the particular pattern has having a significant causal link to achieving that particular common outcome.

Process 700 may include indexing or otherwise storing (at 711) each validated pattern along with the outcome probability that is modeled for that validated pattern. The indexing (at 711) may allow for fast matching of the pattern and/or lookup of the outcome probability. The indexing may include hashing the set of conversation elements from the validated pattern to produce a value that uniquely identifies that validated pattern.

Conversation system 100 may dynamically generate and/or update scripts, plans, and/or workflows, that are provided to and followed by the agents in order to produce desired outcomes, based on the validated patterns. For instance, conversation system 100 may determine that 100% of conversations that yielded a completed sales outcome included a first validated pattern for politely greeting the conversation participants within the first two minutes of the conversation, may determine that 65% of conversations that yielded the completed sales outcome involved a first product demonstration during a second period of time, may determine that 80% of conversations that yielded the completed sales outcome involved a different second product demonstration during the second period of time, may determine that 55% of conversations that yielded the completed sales outcome involved discussing pricing after the demonstration, and may determine that 66% of conversations that yielded the completed sales outcome involved allowing the participant to ask questions after the demonstration. Accordingly, conversation system 100 may dynamically generate and/or update the plan for achieving the completed sales outcome to include the greeting within the first two minutes of the conversation, present the second product demonstration instead of the first product demonstration during the second period of time, and allow for the question-and-answer session after the demonstration before discussing pricing. Specifically, conversation system 100 may dynamically generate the plan with patterns that maximize the probability of achieving the desired outcome. In some embodiments, dynamically generating the plans may include qualifying each pattern based on the agent attributes, participant attributes, and/or other variable that may modify the probability of each pattern. For instance, the probability of achieving a particular outcome with a particular pattern may decrease when the particular pattern is used during a conversation with a participant having a first role, and the probability of achieving the particular outcome with the particular pattern may increase when the particular pattern is used during a conversation with a participant having a different second role. Conversation system 100 may update the plan as the modeling of the probability outcomes changes and/or the recognized patterns for the modeled outcomes change.

In addition to the patterns, a dynamically generated plan may include notifications and/or instructions for the agent to follow. In some embodiments, the notifications and/or instructions may be generated based on the patterns. For instance, conversation system 100 may track the actions that result in certain patterns of conversation elements. In some embodiments, the notifications and/or instructions from a plan may be displayed on a computer or other device with which the agent engages the participants in the conversation. Conversation system 100 may control when each of the notifications and/or instructions from a plan are presented to the agent based on the timing specified in the plan and/or based on the agent following or deviating from plan as determined from the real-time multi-modal monitoring of the conversation.

The plan may also provide conversation system 100 with direct control over certain parts of the conversation. For instance, conversation system 100 may control what presentation materials (e.g., slides, graphics, and/or other visual guides) are presented to the participants.

As noted above, conversation system 100 may generate different plans based on different combinations of validated patterns that achieve the same outcome with the greatest probability, and may qualify the different plans based on different participant attributes. For instance, conversation system 100 may determine that a first set of validated patterns from a first plan result in an 80% likelihood of achieving a completed sale when the participant has the title of vice president of product, product director, product lead, or chief product officer ("CPO"), and a lesser 60% likelihood of achieving a completed sale when the participant has the title of vice president of engineering, director of engineering, engineering manager, or chief technology officer ("CTO"). Similarly, conversation system 100 may determine that a different second set of validated patterns from a second plan result in a 55% likelihood of achieving a completed sale when the participant has the title of vice president of product, product director, product lead, or CPO, and a lesser 78% likelihood of achieving a completed sale when the participant has the title of vice president of engineering, director of engineering, engineering manager, or CTO. The plans may also be qualified based on expertise, experience level, age, sex, and/or other attributes of the agent and/or participants of a conversation.

Conversation system 100 may dynamically control a conversation even before the conversation begins by selecting a plan for the conversation and directing the conversation according to the patterns defining the plan. For instance, the plan and/or patterns that form the plan may define the sequencing of topics for that conversation, what should be said and presented as part of that sequencing or each topic, different behaviors that the agent should exhibit, and/or other actions to perform during the conversation. Conversation system 100 may select the plan for a particular conversation based on information that conversation system 100 gathers about the conversation participants and agent via the participant modality, and may dynamically control the particular conversation based on the selected plan. Similarly, conversation system 100 may use previously acquired information about a participant as well as behavioral models for the agents and participants with similar attributes to select a particular agent to handle future conversations or deals with that participant. In particular, conversation system 100 may use the previously acquired information about the participant to select a participant behavioral model that models the probability of certain outcomes with that participant when exposed to different conversational patterns, and may select an agent behavioral model with the highest probability of producing a particular conversational pattern that leads to the highest probability of achieving a desired outcome with that participant. Conversation system 100 may then select an agent to conduct future conversations or deals with the participant based on the selected agent behavioral model.

Figure 8:
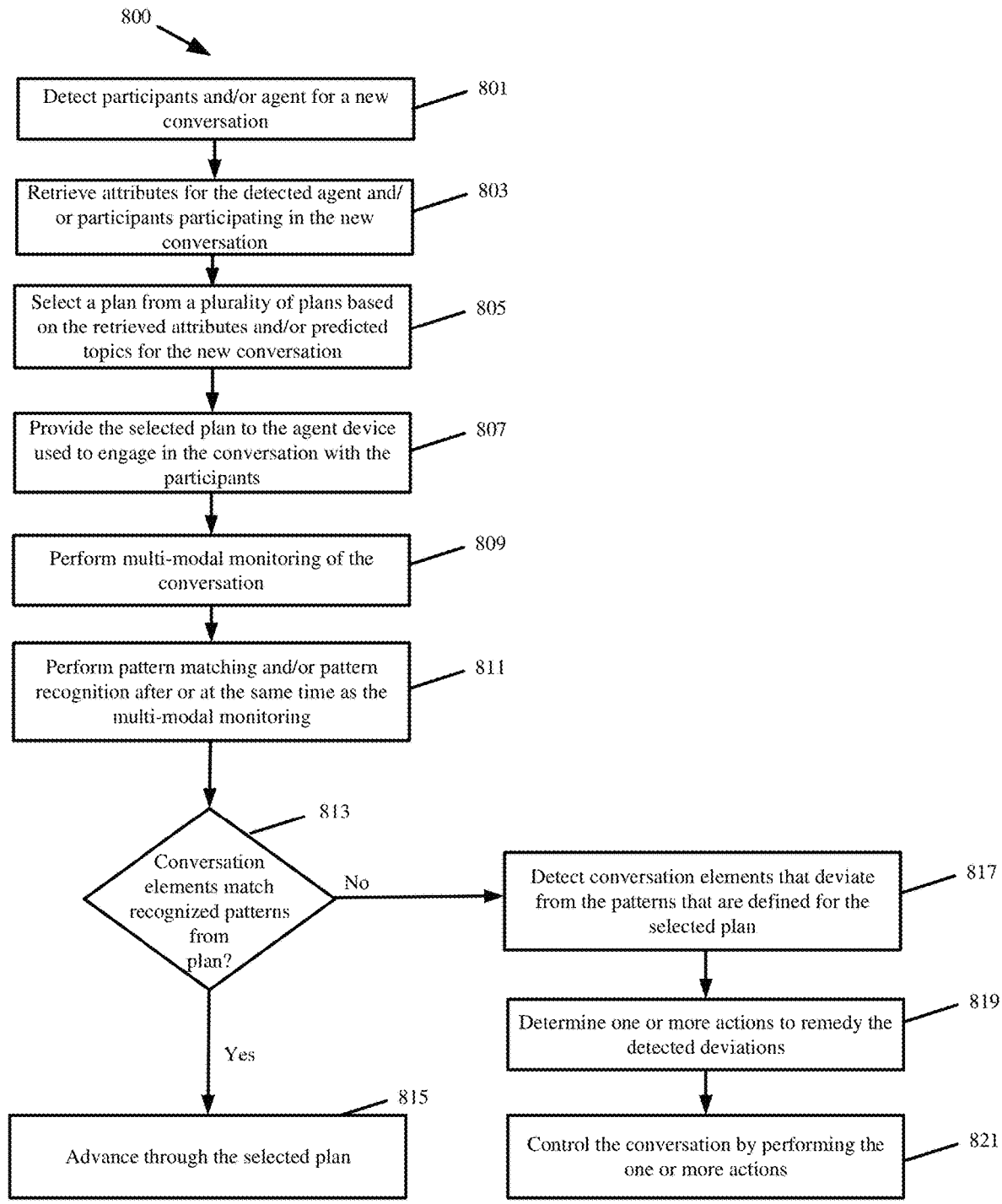
FIG. 8 presents a process for dynamically controlling a conversation based on a selected plan in accordance with some embodiments presented herein.

FIG. 8 presents a process 800 for dynamically controlling a conversation based on a selected plan in accordance with some embodiments presented herein. Process 800 may be implemented by conversation system 100.

Process 800 may include detecting (at 801) participants and/or agent for a new conversation. In some embodiments, conversation system 100 may be integrated or connected to a device by which a particular agent initiates or receives telephone calls, video conferences, and/or other conversations. Conversation system 100 may identify the participants and/or agent for the new conversation by identifying the telephone number, email address, or other identifier for the participants that will participate in that conversation. The telephone number may be detected from an outbound call being placed by the agent, or by the callerID of an inbound call being routed to the agent. The email address and/or other identifiers may be determined from a scheduled meeting in the calendar of the agent. In some embodiments, conversation system 100 may detect (at 801) the participants based on other identifiers such as the Internet Protocol ("IP") network address that each participant uses to connect to the conversation.

Process 800 may include retrieving (at 803) attributes for the detected (at 801) agent and/or participants participating in the new conversation. Conversation system 100 may retrieve (at 803) the attributes by performing a lookup based on the telephone number, email address, IP address, and/or another identifier for each detected participant and/or agent. Conversation system 100 may retrieve (at 803) the attributes from internal sources (e.g., the participant modality), or may retrieve (at 803) the attributes and populate the participant modality by performing queries and/or searches of external sources based on the telephone number, email address, and/or another identifier for each detected participant and/or agent. The internal sources may be populated with the participant attributes based on past conversation with those same participants. The retrieved (at 803) attributes may include a title, role, level of experience, age, sex, past history, areas of expertise, and/or other descriptive information for the agent and the one or more participants.

In some embodiments, retrieving (at 803) the attributes for the participants may include retrieving any participant-specific information that is tracked for the identified participants in the participant modality. For instance, using the telephone number, email address, IP address, and/or other identifier for a particular participant, conversation system 100 may retrieve a participant profile that is created for that particular participant based on past conversations involving that particular participant and further based on conversation elements and/or patterns from the past conversations. The participant profile may include preferences (e.g., likes, items or subject matter of interest, past agent behavior to which the particular participant positively responded, etc.), and/or may include a last tracked state for the particular participant from the previous conversations with that particular participant. The last tracked state may identify any progress that was made in the previous conversations, incomplete or pending action items with the particular participant, and/or other tracked activity for achieving a desired outcome with that particular participant.

Process 800 may include selecting (at 805) a plan from a plurality of plans based on the retrieved (at 803) attributes and/or predicted topics for the new conversation. The predicted conversation topics may be determined from a scheduled meeting invitation or calendar entry of the agent. The predicted conversation topics may include sales conversations, value-add conversations, technical support conversations, partnership conversations, and/or other types of conversations that an agent may have with different participants. Selecting (at 805) the plan may include selecting (at 805) the plan that is modeled to have the greatest probability of achieving a desired outcome or disposition for a conversation involving participants and agents having the retrieved (at 803) attributes. More specifically, each plan of the plurality of plans may be defined with instructions, operations, workflows, and/or patterns to achieve a desired outcome, and the selected plan may have the highest likelihood of all plans from the plurality of plans for achieving the desired outcome based on retrieved attributes of the agent, one or more participants, and/or predicted conversation topics.

The selected plan may provide a script that the agent is to follow in order to achieve the desired outcome. The script may be based on the patterns of the plan, and may provide a specific sequencing of topics, certain words and phrases to recite at certain times, certain behaviors or mannerisms to adhere to, selected presentation materials to present to the participants at different times or in response to different conditions, and/or other actions that the agent manually performs or that conversation system 100 automatically performs to control the conversation towards the desired outcome.

In some embodiments, selecting (at 805) the plan may include customizing the plan based on the retrieved (at 803) participant attributes. In particular, conversation system 100 may customize the plan according to a participant profile and/or last tracked state. The customizations may include adding, removing, or modifying parts of the plan based on preferences of the participants that were learned from previous conversation. The customizations may include adding, removing, or modifying parts of the plan to advance past parts of the plan that have already been completed or are now unnecessary because of the last tracked state and completed actions in previous conversations, or to include incomplete or pending actions from the past conversations with the same participant.

Process 800 may include providing (at 807) the selected plan to the device that the agent uses to engage in the conversation with the participants. Providing (at 807) the selected plan may also include configuring a presentation with different slides, images, websites, and/or other content to present at different points within the conversation. Once provided (at 807) to the agent device, the selected plan may provide various visual or audible instruction for the agent to follow. Additionally, conversation system 100 may use the selected plan to determine whether the conversation adheres to the plan and is therefore likely to achieve the desired outcome with the probability that is determined for the plan, or whether the conversation deviates from the plan and requires dynamic control of the conversation at different times by conversation system 100.

Process 800 may include performing (at 809) the multi-modal monitoring once the conversation commences. Performing (at 809) the multi-modal monitoring may include parsing and/or analyzing the spoken words of the conversation and the various interactions between the agent and the participants in order to populate different modalities with different conversation elements relating to the spoken words, behavior, sentiment, metrics, facial expressions, mannerisms, responses to various presentation topics, and the like.

Process 800 may include performing (at 811) pattern matching and/or pattern recognition after or at the same time as the multi-modal monitoring. Conversation system 100 may perform (at 811) the pattern matching and/or pattern recognition using different sets of conversation elements that are extracted from the active conversation as a result of the multi-modal monitoring, and patterns that define the selected plan or that are recognized from different sets of completed conversations to produce various outcomes with different probabilities.

In some embodiments, conversation system 100 may determine which sets of conversation elements to select from which modalities at different times based on the patterns that are defined for the selected plan. For instance, the selected plan may include a first pattern that includes a sentiment conversation element from the sentiment modality and a metric for greeting terms from the conversation metrics modality during a first time of the conversation, and may include a second pattern that includes a sentiment conversation element from the sentiment modality, metrics for the length of speaking time by the agent and participants from the conversation metrics modality, metrics for the number of questions asked from the conversation metrics modality, participant roles from the participant modality, and reactionary responses from the presentation modality during a second time of the conversation. Accordingly, conversation system 100 may recognize patterns by combining the values that the multi-modal monitoring generates for the conversation elements of the first pattern and the second pattern as the conversation is taking place, and by comparing the combined values for the conversation elements against the first pattern and the second pattern defined in the plan.

In some embodiments, performing (at 811) the pattern matching may include conversation system 100 selecting different combinations of conversation elements that have been populated to the different modalities, and determining if the combinations of conversation elements match to any patterns that are recognized from a set of completed conversations. In some such embodiments, the patterns for the pattern matching are not limited to the patterns that are defined for the selected plan, and may include any patterns that are recognized to produce various outcomes with different probabilities.

Process 800 may include determining (at 813) whether the sets of conversation elements extracted from the conversation match one or more patterns that define the selected plan or that are recognized from different sets of completed conversations to produce various outcomes with different probabilities. The determination (at 813) may reveal whether the interactions between the agent and participants and/or the conversation flow follow or deviate from the desired interactions and/or flow set forth in the selected plan for achieving the desired outcome with the greatest determined probability.

In response to determining (at 813—Yes) that the sets of conversation elements from the conversation match the patterns that are defined for the selected plan, process 800 may continue advancing (at 815) through the selected plan. Advancing (at 815) through the selected plan may include monitoring the conversation and/or performing actions that are defined in the selected plan for directing the conversation towards the desired outcome. In some embodiments, conversation system 100 may take no action, and may allow the agent to conduct the conversation without interruption by conversation system 100 so long as the sets of conversation elements from the conversation continue to match the patterns from the selected plan. In some other embodiments, conversation system 100 may provide notifications, instructions, and/or messages to the agent for when to change the topic of conversation, when to change behavior, and/or when to provide other information in order to maintain conformance with the selected plan. Additionally, conversation system 100 may update the presentation for the conversation according to new content that is specified in the selected plan.

In response to determining (at 813—No) that the sets of conversation elements from the conversation do not match the patterns that are defined for the selected plan or match to other patterns with a probability of deviating from the desired outcome, process 800 may assert control over the conversation in order to change the conversation for better conformance with the patterns of the selected plan. Specifically, process 800 may include detecting (at 817) one or more conversation elements from the sets of conversation elements that deviate from the patterns that are defined for the selected plan. For example, conversation system 100 may detect (at 817) that a participant expresses an angry sentiment, whereas the pattern for the selected plan calls for a happy sentiment for the participant. As another example, conversation system 100 may detect (at 817) that conversation metrics for the conversation identify the participant asking less than a threshold number of questions, wherein the threshold number of questions may be defined as part of a pattern of the selected plan.

In response to detecting (at 817) one or more such conversation element deviations, process 800 may include determining (at 819) one or more actions to remedy the deviations and/or change the flow of conversation to return to the flow of the selected plan. In some embodiments, the one or more actions may be derived directly from the conversation elements that deviate from the plan patterns, and/or from a causal association between the actions and the deviating conversation elements.

The one or more actions to remedy the deviations may include actions that are performed by the agent or conversation system 100 to change subsequent conversation elements to match with subsequent patterns of the selected plan. Continuing with the examples above, conversation system 100 may identify the angry sentiment of the participant and/or may inspect other conversation element at the same time of the conversation to ascertain the basis for the angry sentiment, and may determine (at 819) one or more actions that include providing the agent instruction to allow the participant to speak uninterrupted, to change the scope of the conversation, to offer the participant an incentive, to ask the participant specific questions, and/or to use certain conversation techniques to calm the participant. Similarly, in response to detecting (at 817) that the participant is asking less than the threshold number of questions, conversation system 100 may determine (at 819) one or more actions that include prompting the agent to stop speaking and ask if the participant has any questions, prompting the agent to ask specific questions to engage the participant, and/or changing the topic of conversation to a topic that may be more interesting for the participant based on the participant attributes.

Process 800 may include controlling (at 821) the conversation by injecting conversation system 100 into the conversation and performing the one or more actions. Performing the one or more actions may include providing alerts, notifications, instructions, and/or messages to the device of the agent. These actions may produce a change in the topic of conversation, the agent's behavior, the phrasing used by the agent, and/or other behaviors of the agent. Performing the one or more actions may include automated operations including changing the materials that are presented to the participants, dynamically changing pricing or inventive that are offered or made available to the participant, dynamically changing the plan or the script that is being followed by the agent to redirect the flow of the conversation. For instance, before the conversation begins, conversation system 100 may select a first plan that has the highest probability of all available plans for selling a first product to participants with similar attributes as the participants expected to participant in the conversation. However, through the multi-modal monitoring, conversation system 100 may detect that the conversation is deviating from the selected plan because the participants have no interest in the first product. Accordingly, conversation system 100 may dynamically control (at 821) the conversation by altering the selected plan to transition off the first product, and to introduce and attempt to sell a second product that is not part of the original selected plan, but that better aligns with the interests of the participants.

Conversation system 100 may perform process 800 for each conversation that takes place between any participants and one or more agents of a particular business, and may perform process 800 from the beginning to the end of each conversation. At the conclusion of the conversation, conversation system 100 may implement additional controls to improve upon the selected plan and/or improve the probability of reaching the desired outcome.

Figure 9:
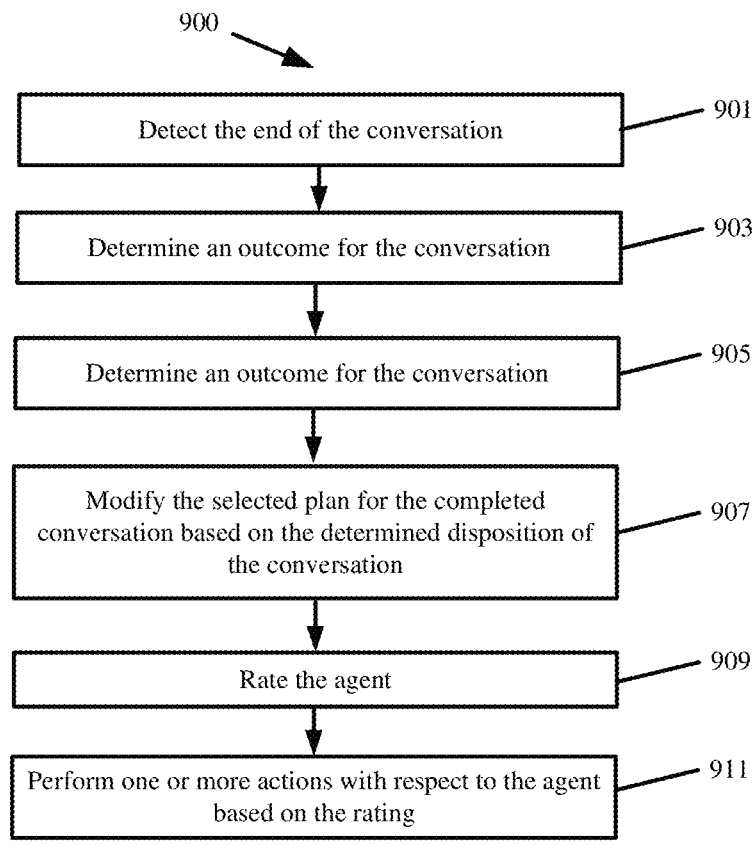
FIG. 9 presents a process for dynamic controls implemented at the end of a conversation in accordance with some embodiments presented herein.

FIG. 9 presents a process 900 for dynamic controls implemented at the end of a conversation in accordance with some embodiments presented herein. Process 900 may be performed by conversation system 100.

Process 900 may include detecting (at 901) the end of a conversation. The conversation may end once the agent or the participant leave the conversation, terminate the telephone call, and/or log out of the video conference.

Process 900 may include determining (at 903) a disposition or outcome for the conversation. The disposition may be based on whether a transaction was completed or entered into by the end of the conversation, whether a follow up conversation was requested or scheduled, whether the participants asked to never be contacted again, and/or other such end states are reached.

Process 900 may include performing (at 905) subsequent actions for the completed conversation based on the determined (at 903) disposition. In some embodiments, the determined (at 903) disposition may include one or more probabilities. The probabilities may specify the likelihood of achieving different results if the conversation or participants are further pursued. For instance, conversation system 100 may determine that, even though a sale was not completed at the end of the conversation, the conversation elements and disposition of the conversation indicate that the sale may be completed with a 70% likelihood if the agent is to provide a demonstrate, subsequent call, or other actions at a later time. Accordingly, performing (at 905) the subsequent actions may include providing the demonstration to the participants after the conversation is completed, scheduling the subsequent calls, or invoking the other actions. Alternatively, conversation system may determine that the conversation has a 15% likelihood of resulting in a completed sale if pursued further, so the subsequent actions may include removing the participants from future contacts.

Process 900 may include dynamically modifying (at 907) the selected plan for the completed conversation based on the determined (at 903) disposition of the conversation. Dynamically modifying (at 907) the selected plan may include updating or replacing one or more patterns of the selected plan with new patterns that increase the likelihood or probability of achieving the desired outcome for the selected plan. For instance, the agent may have correctly followed every step of the selected plan without achieving the desired outcome set for the plan. In this case, conversation system 100 may change one or more parts of the plan to improve the likelihood that a future conversation using the selected plan will achieve the desired outcome. For instance, conversation system 100 may detect, from the conversation elements of the completed conversation, a particular part of the conversation in which interest of the participants waned based on the monitored conversation elements at that particular part of the conversation, and may modify the topic of conversation, the presentation materials, the wording for the script recited at that particular part, and/or other changes to that particular part of the conversation.

Process 900 may include rating (at 909) the agent that conducted the conversation based on the agent's adherence to the selected plan and/or the dynamic changes implemented by the conversation system 100 throughout the conversation. The rating (at 909) may define the effectiveness of the agent with respect to achieving the desired outcome of the selected plan. In some embodiments, rating (at 909) the agent may include generating a score for the agent based on the detected behavior of the agent on the conversation (e.g., how often does the agent interrupt, does the agent use reflective listening techniques, and/or other best practices), the effectiveness of the agent in responding to questions from the participants, the effectiveness of the agent in engaging or interacting with the participants, the effectiveness of the agent in presenting the topics of conversation (e.g., presenting with an excited tone of voice or with a monotone uninterested tone of voice), and/or other observations derived from the conversation elements.

Process 900 may include performing (at 911) one or more actions with respect to the agent based on the rating. For instance, conversation system 100 may determine that the agent continually deviated from the selected plan based on the deviating conversation elements of the conversation deviating from the selected plan patterns. Conversation system 100 may rate (at 909) the agent based on these deviations, and may perform (at 911) one or more actions including providing additional training for the agent, flagging the conversation for a supervisor to review with the agent, and/or reassigning the agent to different conversations (e.g., determining that the agent underperforms in conversations for selling a first product, but excels in conversation for selling a different second product).

Figure 10:
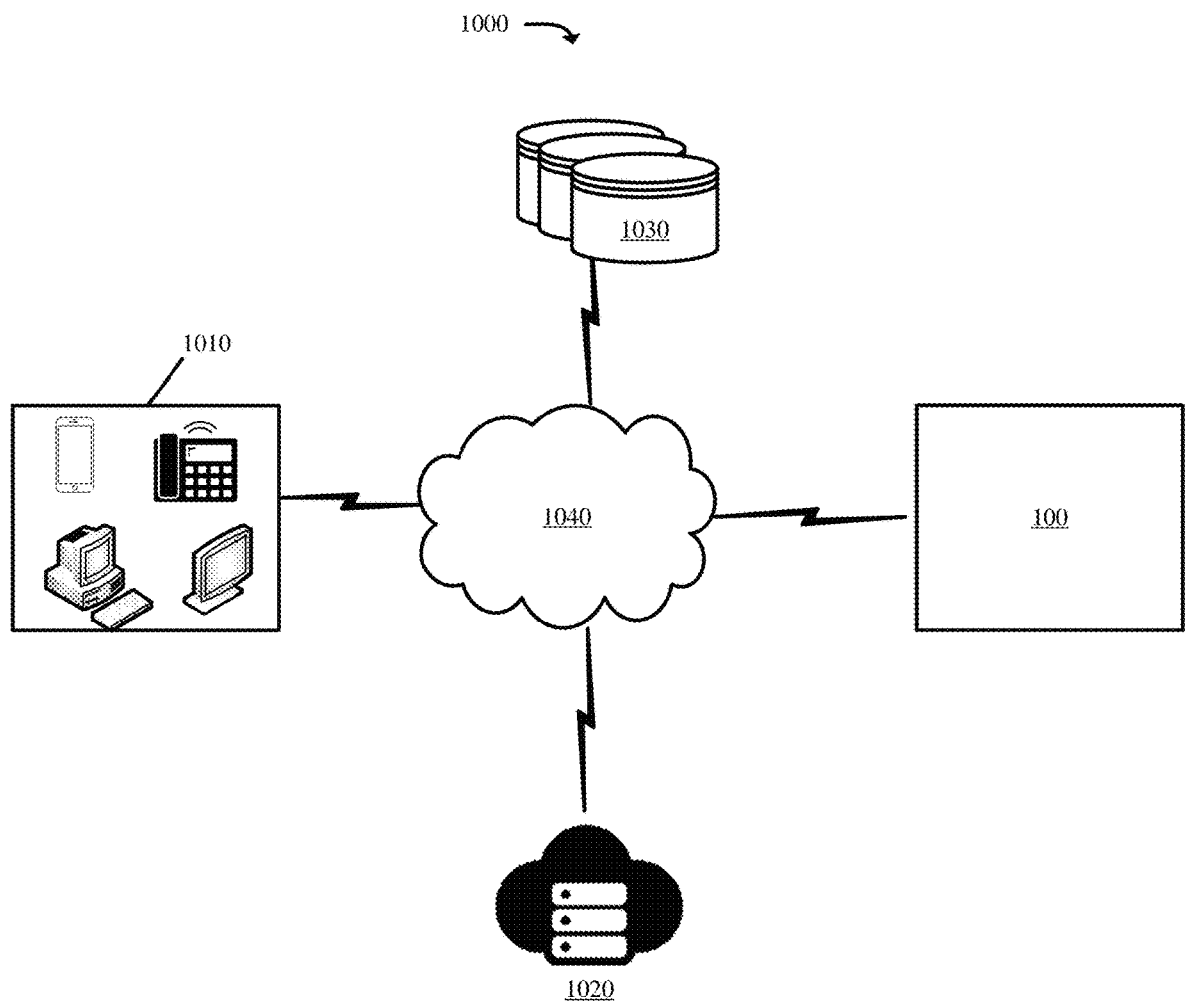
FIG. 10 illustrates an example environment in which one or more embodiments, described herein, may be implemented.

FIG. 10 illustrates an example environment 1000 in which one or more embodiments, described herein, may be implemented. As shown in FIG. 10, environment 1000 may include conversation system 100, conversation control devices 1010 used by the agents, support devices 1020, one or more databases 1030, and network 1040.

The quantity of devices, components, and/or networks, illustrated in FIG. 10, is provided for explanatory purposes only. In practice, environment 1000 may include additional devices, components, and/or networks; fewer devices, components, and/or networks; different devices, components, and/or networks; or differently arranged devices, components, and/or networks than illustrated in FIG. 10. One or more of the devices of environment 1000 may perform one or more functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000. For instance, conversation system 100 may be implemented on one or more of support devices 1020.

Conversation system 100 may include one or more devices that monitor and control different conversations within one or more entities (e.g., companies or businesses) according to the embodiments described above. Conversation system 100 may be integrated as part of an intelligent softphone solution, telephony services, video conferencing solution, remote meeting solution, sales solution, and/or other suite of services. Accordingly, conversation system 100 may be configured with access to other systems and databases 1030 of an entity, and may obtain information from those systems and databases 1030. Conversation system 100 may be located on-premises (e.g., at a business location) or may be implemented in the "cloud" remote from the entity using conversation monitoring and control services of conversation system 100.

Conversation system 100 may obtain real-time feeds of each conversation involving an agent or conversation control device 1010. Conversation system 100 may obtain the feeds via a connection to conversation control devices 1010.

Conversation system 100 may perform the multi-modal monitoring and may extract conversation elements for the different modalities from each conversation as the conversation unfolds. Conversation system 100 may include various speech recognition, facial recognition, sentiment detection, and/or other components that are used to perform the multi-modal monitoring. Conversation system 100 may also leverage these components and/or AI/ML for analysis of the dialog, facial expressions, and/or mannerisms, and for extracting sentiment, tone, behavior, workflow progression, conversation disposition, timing, and/or other metrics or insight from different points of a conversation. In some embodiments, each extracted conversation element may be tagged to a speaker (e.g., an agent or a particular participant), and may also be tagged with a timestamp to identify the point in the conversation where the conversation element was extracted.

Conversation system 100 may perform the pattern recognition to group different sets of the extracted conversation elements from the different modalities based on patterns identified in a selected plan for the particular conversation or patterns recognized from other completed sets of conversations, may compare the extracted conversation elements against the recognized patterns, and may dynamically control different parts of the particular conversation based on continued progress through the selected plan or detected deviation with the recognized patterns.

Conversation system 100 may store a recording of each conversation along with the conversation elements extracted from each conversation in databases 1030. Conversation system 100 may include an AI/ML component that accesses the conversation elements of completed conversations from databases 1030, determines the dispositions of the completed conversations, generates or updates plans based on recognized patterns within the completed conversations having a common disposition, and/or models the probability of each plan or recognized pattern achieving a certain outcome or disposition. Conversation system 100 may also access the completed conversations in databases 1030 in order to assess and/or rate the effectiveness of the agents.

In some embodiments, conversation system 100 may use support devices 1020 for conversation element extraction and/or dynamic conversation control. Support devices 1020 may include a set of cloud resources that can be dynamically scaled and put in use based on the number of simultaneous conversations. For instance, each conversation control device 1010 may feed the audio stream and/or video stream from an active conversation to conversation system 100. Conversation system 100 may then initiate an extraction instance on support devices 1020 for each active conversation, and may provide the audio stream and/or the video stream to the initiated extraction instance. The initiated extraction instance may include a virtual machine, container, or executable service that extracts conversation elements from the provided stream or streams, and that provides the extracted conversation elements back to conversation system 100. In this manner, conversation system 100 may use a set of extraction instances running on support devices 1020 to simultaneously extract conversation elements from a set of conversations in parallel. Similarly, conversation system 100 may initiate a different AI/ML instance on support devices 1020 to perform the pattern recognition, pattern deviation determination, and dynamic conversation control for different conversations.

Conversation control devices 1010 may include softphones, computers, or other devices that the agents use for the dynamically controlled conversations with the participants. Conversation control devices 1010 may provide a dialer or conferencing solution that initiates and establishes conversations with different participants. Conversation control devices 1010 may include a display for presenting information about the participants and/or for presenting presentation materials to the participants. Conversation control devices 1010 may also connect to conversation system 100 over network 1040 to receive messaging and/or controls from conversation system 100. The messaging can be used to update the display of conversation control devices 1010, and provide real-time instructions or commands to control a conversation while the agent is engaged in that conversation. Conversation system 100 may also control the operation of conversation control devices 1010 in order to route conversations, add participants to a conversation, insert audible prompts, change the conversation flow, and/or perform other operations or actions.

Network 1040 facilitates the intercommunication between conversation system 100 and conversation control devices 1010, support devices 1020, and databases 1030. Network 1040 may include a Local Area Network ("LAN"), a private enterprise network, a core network of a wireless telecommunications network, an Internet Protocol-based packet data network ("PDN"), a wide area network ("WAN") such as the Internet, and/or one or more other networks.

Figure 11:
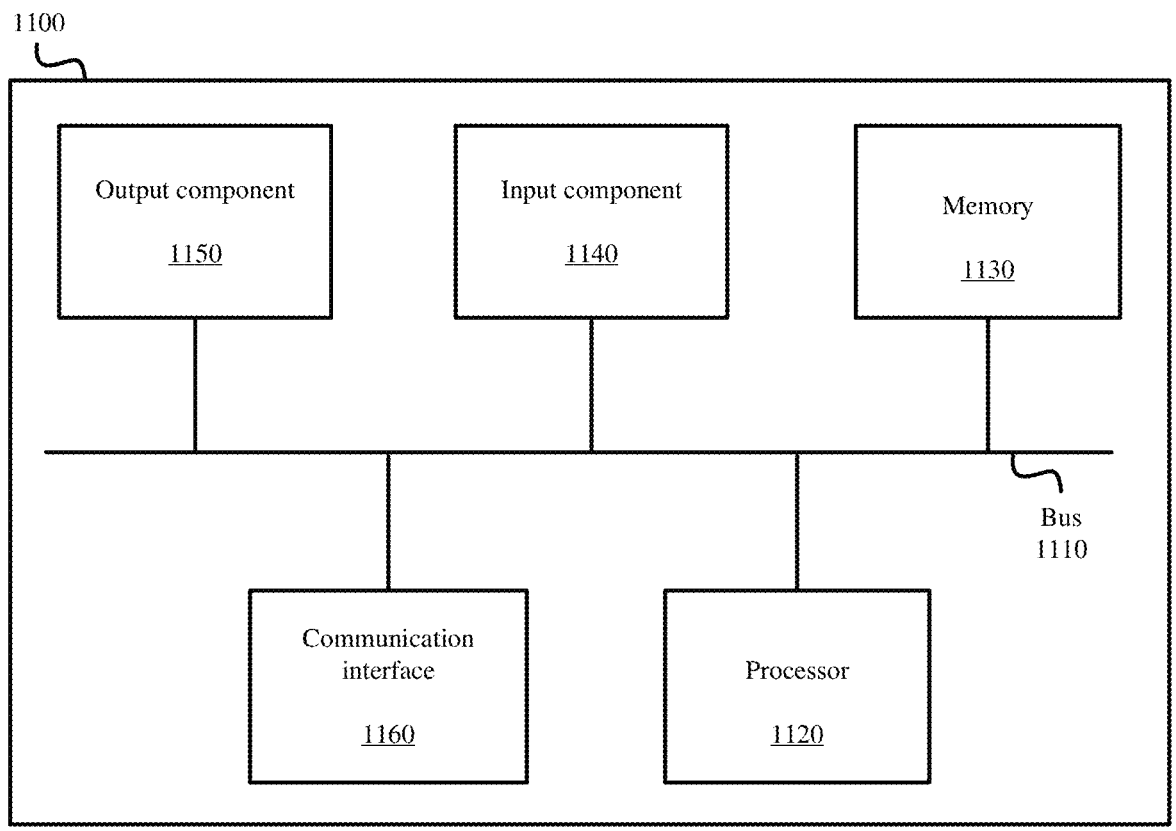
FIG. 11 illustrates example components of one or more devices, according to one or more embodiments described herein.

FIG. 11 is a diagram of example components of device 1100. Device 1100 may be used to implement conversation system 100, conversation control devices 1010, support devices 1020, databases 1030, and/or other instances for performing the AI/ML described above. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   tracking, with a conversation system, a plurality of elements from each of a plurality of conferences;
   classifying, with the conversation system, outcomes of the plurality of conferences based on the plurality of elements tracked for each conference of the plurality of conferences, wherein said classifying comprises classifying a first set of the plurality of conferences with a first outcome and a second set of the plurality of conferences with a second outcome;
   generating, by the conversation system, an outcome model based on a set of elements that are present in the plurality of elements of at least a first threshold number of the first set of conferences and that are not present in the plurality of elements of at least a second threshold number of the second set of conferences; and
   controlling, by the conversation system, a conference between two or more participants based on the outcome model.

2. The method of claim 1 further comprising:
   defining a plan comprising one or more actions based on the outcome model; and
   wherein controlling the conference comprises presenting different actions from the plan to at least one of the two or more participants at different times during the conference.

3. The method of claim 1 further comprising:
   determining a first set of attributes for a first set of participants involved in the first set of conferences, and a second set of attributes for a second set of participants involved in the first set of conferences;
   determining a first set of actions performed in the first set of conferences involving the first set of participants that resulted in the set of elements, and a second set of actions performed in the first set of conference involving the second set of participants that resulted in the set of elements;
   matching attributes of the two or more participants in the conference to the second set of attributes; and
   wherein controlling the conference comprises implementing the second set of actions instead of the first set of actions at different times during the conference in response to said matching.

4. The method of claim 1, wherein controlling the conference comprises:
   extracting elements from different points in the conference; and
   performing an action that modifies an audio or video interface of at least one of the two or more participants in response to one or more elements extracted from the conference deviating from the set of elements of the outcome model.

5. The method of claim 1 further comprising:
   extracting elements from different points in the conference;
   tracking state of the conference based on a comparison of the elements from the different points in the conference to the set of elements from the outcome model; and
   wherein controlling the conference comprises implementing an action based on one or more elements at a specific point in the conference differing from one or more elements of the set of elements.

6. The method of claim 1, wherein generating the outcome model comprises:
   calculating a probability that the set of elements affected the first outcome for the first set of conferences; and
   determining that the probability is greater than a threshold probability.

7. The method of claim 1, wherein controlling the conference comprises:
   generating a plan to control actions of at least one of the two or more participants during the conference; and
   modifying the plan at different times during the conference based on states of the conference deviating from the plan at the different times.

8. The method of claim 1 further comprising:
   monitoring elements of the conference;
   comparing the elements of the conference to the set of elements from the outcome model; and
   predicting an outcome classification for the conference based on said comparing.

9. The method of claim 8, wherein controlling the conference comprises:
   inducing a change in the conference in response to the outcome classification for the conference differing from the first outcome.

10. The method of claim 1, wherein generating the outcome model comprises:
    modeling different probabilities of the set of elements producing each of the outcomes based on a presence or absence of the set of elements in the plurality of elements from the plurality of conferences.

11. The method of claim 1, wherein generating the outcome model comprises:
    performing pattern recognition across the plurality of elements of the plurality of conferences; and
    detecting the set of elements as common elements for a conference of the first outcome.

12. The method of claim 1, wherein generating the outcome model comprises:
    modeling probabilities for an association between different sets of the plurality of elements and each outcome of a plurality of outcomes;
    determining that the probabilities associated with the set of elements and the first outcome is greater than the probabilities associated with other sets of elements and the first outcome; and
    determining a sequence of actions that caused the set of elements in the first set of conferences.

13. The method of claim 12, wherein determining the sequence of actions comprises:
    analyzing the first set of conferences; and
    identifying each action of the sequence of actions that precede one or more elements of the set of elements.

14. The method of claim 12, wherein determining the sequence of actions comprises:
  identifying one or more elements occurring in the first set of conferences before each element of the set of elements; and
  defining a plan for at least one participant of the two or more participants to repeat each of the one or more elements during the conference.

15. The method of claim 1 further comprising:
  determining a first set of attributes associated with one or more participants engaged in the first set of conferences;
  linking the outcome model to the first set of attributes; and
  selecting the outcome model, from a plurality of different outcome models, for the conference based on a second set of attributes associated with the two or more participants of the conference matching the first set of attributes linked to the outcome model.

16. The method of claim 1, wherein generating the outcome model comprises:
  determining attributes associated with participants engaged in the first set of conferences; and
  adjusting the set of elements of the outcome model based on the attributes associated with the participants engaged in the first set of conferences, wherein adjusting the set of elements comprises modifying a weight attributed to one or more of the set of elements based on the attributes associated with the participants.

17. The method of claim 1, wherein generating the outcome model comprises:
  generating a different behavioral model for each of a plurality of different agents involved in one or more of the first set of conferences based on an effectiveness of each agent reaching a desired outcome with respect to a particular topic in the first set of conferences; and
  assigning a particular agent from the plurality of different agents as one of the two or more participants of the conference based on the conference being associated with the particular topic and the behavioral model of the particular agent indicating a greater effectiveness in reaching the desired outcome with respect to the particular topic than the behavioral model of other agents from the plurality of agents.

18. The method of claim 1,
  wherein generating the outcome model comprises:
    generating a different behavioral model for each participant involved in one or more of the first set of conferences based on reactions of each participant to different subsets of elements from the first set of conferences; and
    selecting a particular behavioral model for the conference based on the particular behavioral model being generated for a particular participant in one or more of the first set of conferences and the two or more participants of the conference having attributes in common with the particular participant; and
  wherein controlling the conference comprises:
    providing subject matter for discussion at different times during the conference based on the particular behavioral model.

19. A conversation system comprising:
  one or more processors configured to:
    track a plurality of elements from each of a plurality of conferences monitored by the conversation system;
    classify outcomes of the plurality of conferences based on the plurality of elements tracked for each conference of the plurality of conferences, wherein said classifying comprises classifying a first set of the plurality of conferences with a first outcome and a second set of the plurality of conferences with a second outcome;
    generate an outcome model based on a set of elements that are present in the plurality of elements of at least a first threshold number of the first set of conferences and that are not present in the plurality of elements of at least a second threshold number of the second set of conferences; and
    control a conference between two or more participants based on the outcome model via a connection between the conversation system and the conference.

20. A non-transitory computer-readable medium of a conversation system, storing a plurality of processor-executable instructions to:
  track, with the conversation system, a plurality of elements from each of a plurality of conferences;
  classify, with the conversation system, outcomes of the plurality of conferences based on the plurality of elements tracked for each conference of the plurality of conferences, wherein said classifying comprises classifying a first set of the plurality of conferences with a first outcome and a second set of the plurality of conferences with a second outcome;
  generate, by the conversation system, an outcome model based on a set of elements that are present in the plurality of elements of at least a first threshold number of the first set of conferences and that are not present in the plurality of elements of at least a second threshold number of the second set of conferences; and
  control, by the conversation system, a conference between two or more participants based on the outcome model.

* * * * *